United States Patent
Ferguson et al.

(10) Patent No.: US 7,734,281 B2
(45) Date of Patent: *Jun. 8, 2010

(54) SYSTEM AND METHOD FOR BUNDLING INFORMATION

(75) Inventors: Tabitha Ferguson, Waterloo (CA); Barry Linkert, Petersburg (CA); Raymond Vander Veen, Waterloo (CA); David Castell, Waterloo (CA); Gary P. Mousseau, Waterloo (CA); Mihal Lazaridis, Waterloo (CA)

(73) Assignee: Research in Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/925,803

(22) Filed: Oct. 27, 2007

(65) Prior Publication Data

US 2008/0109560 A1    May 8, 2008

Related U.S. Application Data

(63) Continuation of application No. 11/849,785, filed on Sep. 4, 2007.

(51) Int. Cl.
*H04L 12/58* (2006.01)

(52) U.S. Cl. .................... 455/412.1; 370/401
(58) Field of Classification Search .............. None
See application file for complete search history.

(56) References Cited

U.S. PATENT DOCUMENTS

| | | | |
|---|---|---|---|
| 2001/0014145 A1* | 8/2001 | Kamel et al. | 379/88.19 |
| 2001/0015977 A1* | 8/2001 | Johansson | 370/392 |
| 2002/0133598 A1* | 9/2002 | Strahm et al. | 709/228 |
| 2003/0115311 A1* | 6/2003 | Johnston-Watt et al. | 709/223 |
| 2006/0123079 A1* | 6/2006 | Sturniolo et al. | 709/203 |

* cited by examiner

*Primary Examiner*—Ajit Patel
(74) *Attorney, Agent, or Firm*—The Danamraj Law Group, P.C.

(57) ABSTRACT

A scheme for redirecting data items to a user of a mobile data communication device that is associated with a host system and communicates therewith via a wireless network. In one embodiment, a method comprises: detecting arrival of data items for a user at the host system from one or more senders, the data items being directed to an address associated with the user at the host system; determining a delivery level provisioned for the user at the host system; and responsive to the delivery level, applying a delivery rule with respect to the data items received for the user to bundle at least a portion of the data items for transport in a single transmission to the user via the wireless network.

17 Claims, 19 Drawing Sheets

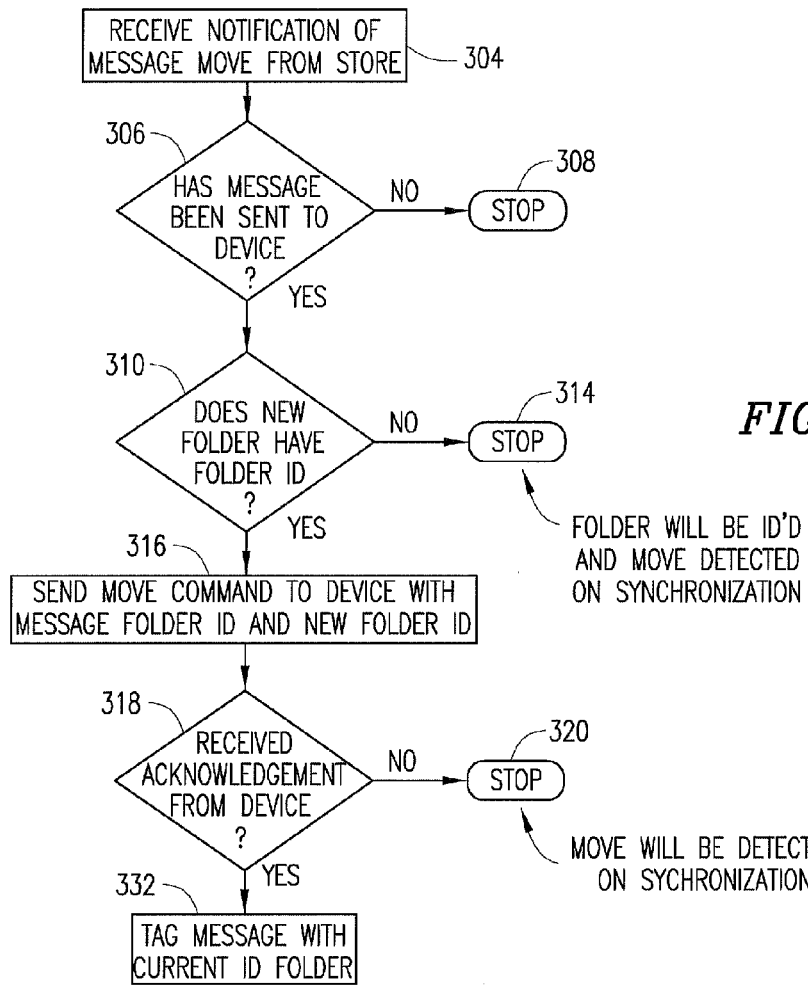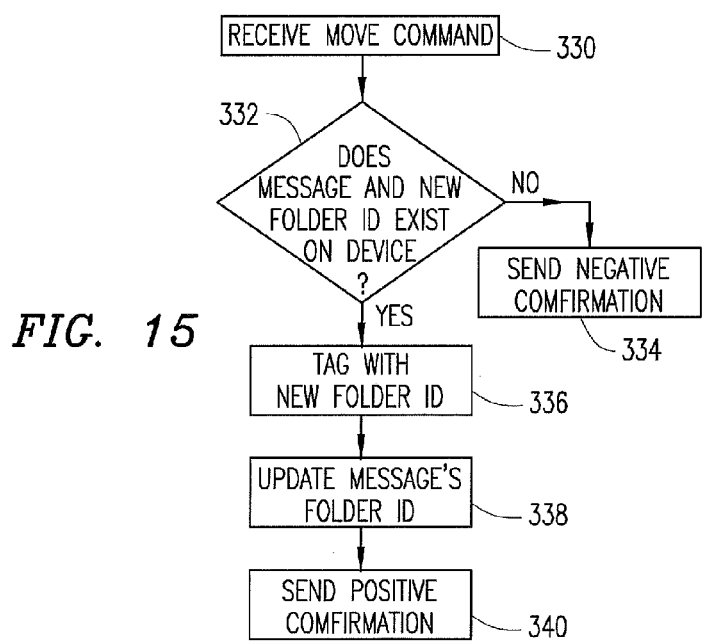
FIG. 14
FIG. 15

SYSTEM AND METHOD FOR BUNDLING INFORMATION

CROSS-REFERENCE TO RELATED APPLICATION

This application is a Continuation application of and claims priority from U.S. patent application Ser. No. 10/970,591, filed on Oct. 14, 2004 (now issued as U.S. Pat. No. 7,266,365). The entirety of this parent application is hereby incorporated herein by reference.

BACKGROUND OF THE INVENTION

1. Field of the Invention

The present invention is directed toward the field of replicating (or synchronizing) information from a host system where the information is normally stored to a mobile data communication device. More specifically, the system and method of the present invention provide an event-driven redirection computer program ("redirector program") operating at the host system, which, upon sensing a particular user-defined event has occurred, redirects user-selected data items from the host system to the user's mobile data communication device. Upon receiving this redirected information at their mobile device, the user can then organize this data into hierarchies, commonly known as folders, and may also perform various other operations on the redirected data. These organizational and other operations are then synchronized back to the original host system for replication. The invention also provides for the synchronization of a storage representation model for storing the data in a hierarchy of folders at the host system and the mobile device.

Instead of warehousing (or storing) the user's data items at the host system and then "synchronizing" the mobile data communication device to data items stored at the host system when the mobile device requests that such items of information be communicated to it, the present invention employs a "push" paradigm that continuously packages and retransmits the user-selected items of information to the mobile data communication device in response to a triggering event detected at the host system. Wireless mobile data communications devices, especially those that can return a confirmation signal to the host that the pushed data has been received are especially well suited for this type of push paradigm.

Once the information is pushed to the device, the user can then read the information and 'file' the information into its appropriate folder based on the contents of the information. Alternatively, the user can perform some other operation on the information. These operations, as well as the user's folder hierarchy for storing information at the mobile device, are then replicated back (synchronized) to the host system, which then automatically organizes the user's information into the same folder hierarchies (or replicates the other operations performed at the mobile device), thus saving the user from doing the action a second time at the host system. The synchronization of the message operations can be carried in real-time as the operations are being executed at the mobile device, or in a batch process when the mobile device is electrically coupled to the host system.

2. Description of the Related Art

Present systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Alternatively, the user might have to perform a special 'connection' action every so often that will synchronous all the pending items required by the user, provided they remember. Software executing on the mobile data communication device then transmits commands via the local communications link or a network link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system.

Another major problem with the current pull-based systems is that the user must deal with the information all over again once the user returns to his office and accesses the information store at the host system. This situation occurs because the average user can get hundreds of pieces of electronic information a day. This is very common in e-mail systems where internal company mail, and external Internet mail, merge into one common mailbox creating a multitude of sources all merged into one location. As a result, once the user returns to their office, even though they may have seen and read the mail while traveling on their mobile device, they still have to re-read the messages and then organize the information into folders based upon the content. This results in user frustration, as the mobile device has not solved the problem of saving them time when the user returns to his office and accesses the information store at the host system.

A general problem with these known synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day.

Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; (2) reconciling large amounts of data, as can accrue in these batch-mode synchronization systems, can require a great deal of communication between the host and the mobile device, thus leading to a more complex, costly and energy-inefficient system; and (3) the need to deal with the information a second time once the user returns to the office and accesses the information store at the host system. A more automated, continuous, efficient and reliable system of ensuring that user data items are replicated (synchronized) at the user's mobile device is therefore needed.

SUMMARY OF THE INVENTION

A system and method of pushing user-selected data items from a host system to a user's mobile data communication device upon detecting the occurrence of one or more user-defined event triggers is provided. The user may then move (or file) the data items to a particular folder within a folder hierarchy stored in the mobile data communication device, or may execute some other system operation on the data item. Software operating at the mobile device and the host system then synchronizes the folder hierarchy of the mobile device with a folder hierarchy of the host system, and any actions executed on the data items at the mobile device are then automatically replicated on the same data items stored at the host system, thus eliminating the need for the user to manually replicate actions at the host system that have been executed at the mobile data communication device.

As used in this application, the term host system refers to the computer where the redirector software is operating. In the preferred embodiment of the present invention, the host system is a user's desktop PC, although, alternatively, the host system could be a network server connected to the user's PC via a local-area network ("LAN"), or could be any other system that is in communication with the user's desktop PC.

A redirector program operating at the host system enables the user to redirect or mirror certain user-selected data items (or parts of data items) from the host system to the user's mobile data communication device upon detecting that one or more user-defined triggering events has occurred. Once the data items are redirected to the user's mobile data communication device, the user may then organize and sort the items into folder hierarchies that are replicated at the host system. Once the user acts upon the redirected data items, such as by reading, organizing, replying or forwarding the data item from the mobile data communication device, the host system is then informed of these actions and automatically reflects the changes on the corresponding data item stored at the host system.

Operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored with related information as to which folder the message might have originally been placed into.

Using the redirector program, the user can select certain data items for redirection, such as E-mail messages, calendar events, meeting notifications, address entries, journal entries, personal reminders, etc. The user can also select which folders get redirected to the mobile device. For example, the user may select that only data items in the Inbox and those in the company X folder shall be sent to the device. Having selected the data items for redirection, the user can then configure one or more event triggers to be sensed by the redirector program to initiate redirection of the user data items. These user-defined trigger points (or event triggers) include external events, internal events and networked events.

Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device.

In addition to the functionality noted above, the redirector program provides a set of software-implemented control functions for determining the type of mobile data communication device and its address, for programming a preferred list of message types or folder names that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can then be altered on a global or per message basis by transmitting a command message from the mobile device to the host system. If the redirector is configured so that the mobile data device cannot receive and process word processor or voice attachments, then the redirector routes these attachments to an external machine that is compatible with the particular attachment, such as a networked printer or fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. In additional to repackaging the information itself, the repackaging may also include properties about the message. This might include the folder from which the message has been detected and pushed to the device. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages appearing to come from the host system even though they are initiated at the mobile device, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet or intranet-based redirector program that could be accessible through a secure webpage or other user interface. The redirector program could be located on an Internet Service Provider's system and accessible only through the Internet.

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

Wireless mobile data communications devices, especially those that can return a confirmation signal to the host that the pushed data has been received, are especially well suited for this type of push paradigm. It is also possible for the mobile data communications device to include additional information with the confirmation signal, including, any one or more of the following actions, the fact that the message: has been read (the information associated therewith is a "read signal"); has been filed in a specific folder (the information associated therewith is a "filed signal"); has been forwarded to another recipient (the information associated therewith is a "forward signal"); or, has been replied to (the information associated therewith is a "reply signal"). These actions can then be synchronized with the host system, thus eliminating the need for the user to perform these actions a second time. The action signals may advantageously be used to indicate the state of the message at the mobile.

One aspect of the invention, therefore, provides a method of indicating at the host system the state of the message at the mobile communications device. The steps of this method preferably include: (A) altering the state of a first message at the mobile communications device thereby creating an altered state; (B) forwarding a status signal to the host system; and, (C) changing at the host system a first message status icon based on the altered state at the mobile communications device. Therefore, according to one aspect of the invention, the message status icon change indicates an altered state of the message at the mobile communication device.

One aspect of the invention, therefore, provides a method of indicating at the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device.

One aspect of the invention provides a method of indicating at a first device, via the host system, the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device; and (F) forwarding a read-receipt to a read-receipt requester's device.

One aspect of the invention provides a method of synchronizing messages between a first system and a second system. The steps of this method preferably include: (A) retrieving a first folder hierarchy from the first system; (B) retrieving a second folder hierarchy from the second system; (C) synchronizing the second folder hierarchy to the first folder hierarchy; (D) retrieving a first plurality of messages from the first system, the first plurality of messages being stored in folders within the first folder hierarchy; (E) retrieving a second plurality of messages from the second system, the second plurality of messages being stored in folders within the second folder hierarchy; (F) comparing the first plurality of messages to the second plurality of messages to identify common messages stored in both the first and second folder hierarchies; (G) determining whether any of the common messages are stored in different folders in the first and second folder hierarchies; and (H) if a common message is located in different folders of the first and second folder hierarchies, then synchronizing the messages by moving the common message to a new folder within the first folder hierarchy or by moving the common message to a new folder within the second folder hierarchy.

Another aspect of the invention provides a method of synchronizing messages stored in a folder hierarchy at a host system and a corresponding folder hierarchy at a mobile data communication device. This method preferably includes the following steps: (A) receiving a message at the host system; (B) storing the message in a first folder of the folder hierarchy at the host system; (C) transmitting the message to the mobile data communication device; (D) storing the message in a first folder of the folder hierarchy at the mobile data communication device; (E) moving the message from the first folder to a second folder at the mobile data communication device; (F) coupling the mobile data communication device to the host system; (G) detecting that the message has been moved to the second folder at the mobile data communication device; and (H) in response to the detection step, moving the message from the first folder at the host system to a second folder of the folder hierarchy at the host system that corresponds to the second folder of the folder hierarchy at the mobile data communication device.

Still another aspect of the invention provides a method of synchronizing messages stored in a folder hierarchy at a host system and a corresponding folder hierarchy at a mobile data communication device, comprising the steps of: (A) receiving a message at the host system; (B) storing the message in a first folder of the folder hierarchy at the host system; (C) transmitting the message to the mobile data communication device; (D) storing the message in a first folder of the folder hierarchy at the mobile data communication device; (E) moving the message from the first folder to a second folder at the mobile data communication device; (F) transmitting a move message from the mobile data communication device to the host system indicating that the message has been moved to the second folder at the mobile data communication device; and (G) receiving the move message at the host system and moving the message stored in the first folder at the host system to a second folder at the host system that corresponds to the second folder at the mobile data communication device.

Yet another aspect of the invention provides a method of synchronizing a first device to a second device, comprising the steps of: (A) providing a first folder hierarchy at the first device; (B) providing a second folder hierarchy at the second device; (C) synchronizing the second folder hierarchy to the first folder hierarchy; (D) retrieving a first plurality of messages stored within the first folder hierarchy and retrieving a second plurality of messages stored within the second folder hierarchy, wherein at least one of the first plurality of messages and at least one of the second plurality of messages are common messages; (E) determining whether the common messages are stored in similar folders within the first and second folder hierarchies; and (F) if the common messages are not stored in similar folders, then synchronizing the common messages so that they are stored in similar folders within the first and second folder hierarchies.

Another aspect of the invention provides a method of synchronizing a first device to a second device, comprising the steps of: (A) providing a first folder hierarchy at the first device; (B) providing a second folder hierarchy at the second device; (C) retrieving a first plurality of messages stored within the first folder hierarchy and retrieving a second plurality of messages stored within the second folder hierarchy; (D) determining whether the first device executed an operation on a message stored in the first folder hierarchy, and if so, then executing the same operation on a corresponding message stored in the second folder hierarchy at the second device.

Still another aspect of the invention provides a system for synchronizing messages between a first device and a second device, comprising: a pair of matching folders, one of the pair of matching folders being located on the first device, the other of the pair of matching folders being located on the second device; a pair of matching messages, one of the pair of matching messages being located on the first device, the other of the pair of matching messages being located on the second device; and means for moving the pair of messages such that if one of the pair of matching messages is moved to one of the pair of matching folders, the other matching message is moved to the other matching folder.

An advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types and folder names that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; (5) the ability to operate locally on a user's desktop system or at a distance via a network server; (6) the ability to store folder hierarchies on the mobile data communications device so that user can organize the information during those periods when information is being redirected to said device; and (7) eliminating the need to organize the information a second time once the user returns to the office to work from their host system.

A further advantage of the present invention is that it provides a software structure and method for managing messages between the mobile data communication device and the host system. The software provides a logical structure for folders and messages that can detect movement of messages between folders on either the mobile data communication device or the host system. This allows the user the flexibility to organize messages into folders on the mobile data communication device without having to replicate the organizational work on the host system, or vice versa. The folder and message software structure further provides the redirector program trigger signals for forwarding messages.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

FIG. 14 is a flow chart showing the steps of sending a move message from the host system to the mobile device after a message has been moved on the host system.

FIG. 15 is a flow chart showing the steps of acting upon the move message command of FIG. 13 at the device.

DETAILED DESCRIPTION OF THE DRAWINGS

Figure 1:
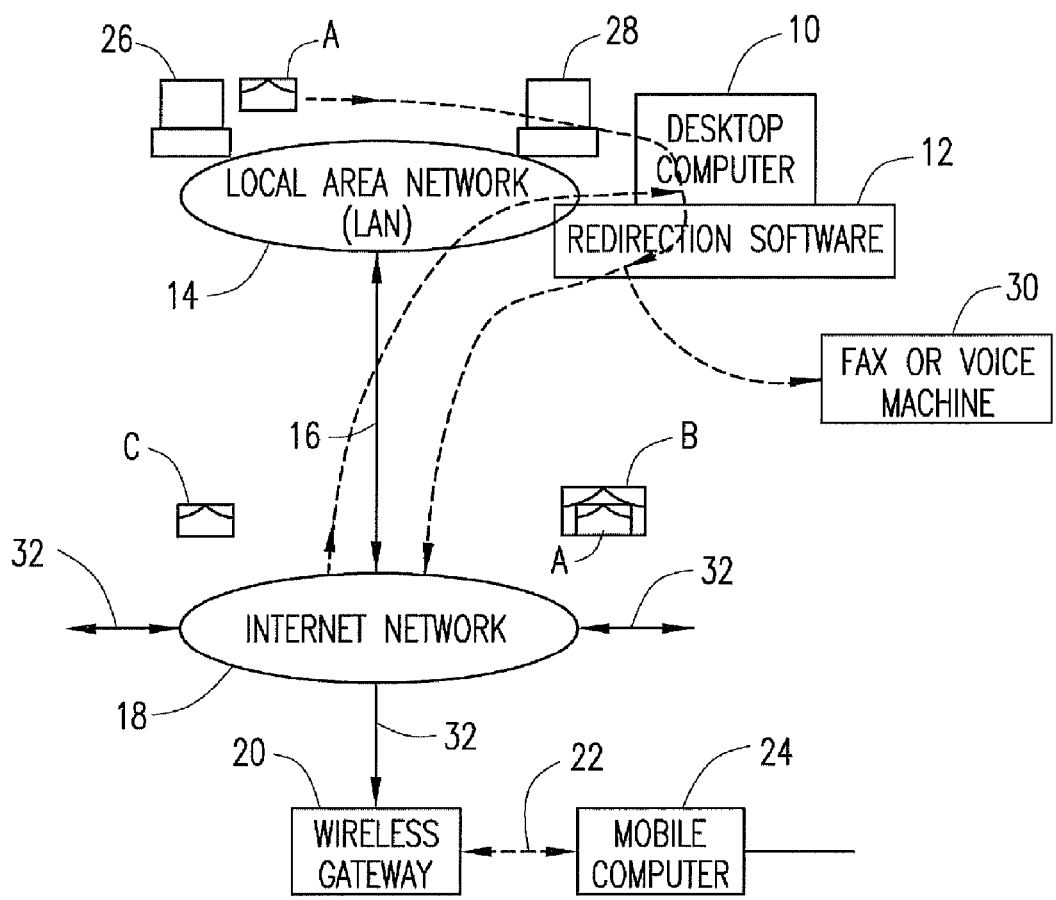
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18, in turn, is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the Internet, and to send the audio clip to the user's voice mail system. This example is not intended to limit the breadth and scope of the invention, but rather to illustrate the variety of possibilities embodied in the redirection concept.

Figure 4:
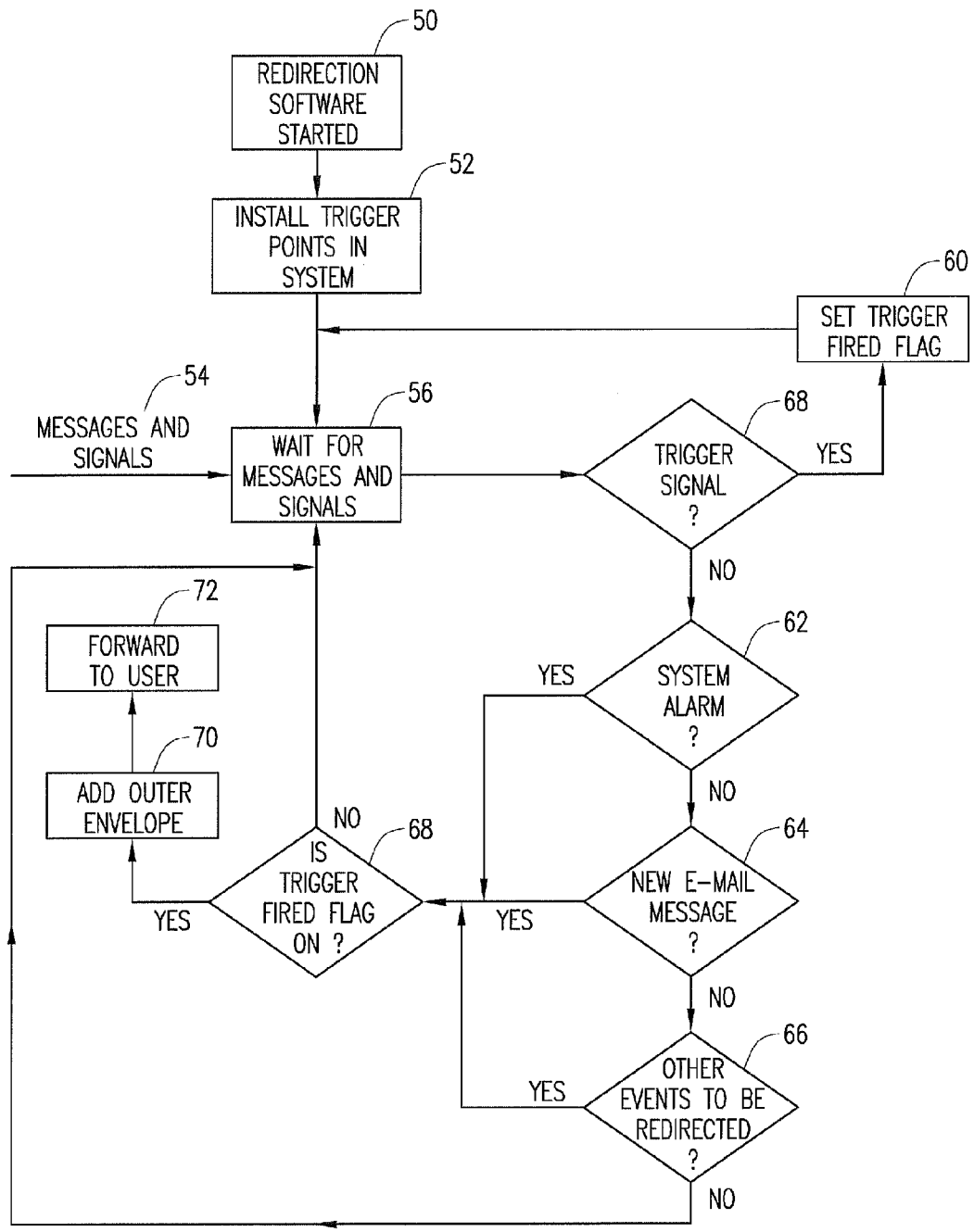
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user of the present invention can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

The user-defined event triggers that can be detected by the redirector program 12 preferably include external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message A for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the particular data item was sent from a sender on the preferred list or has certain message characteristics that if present will trigger or suppress redirection of the message.

In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, then the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
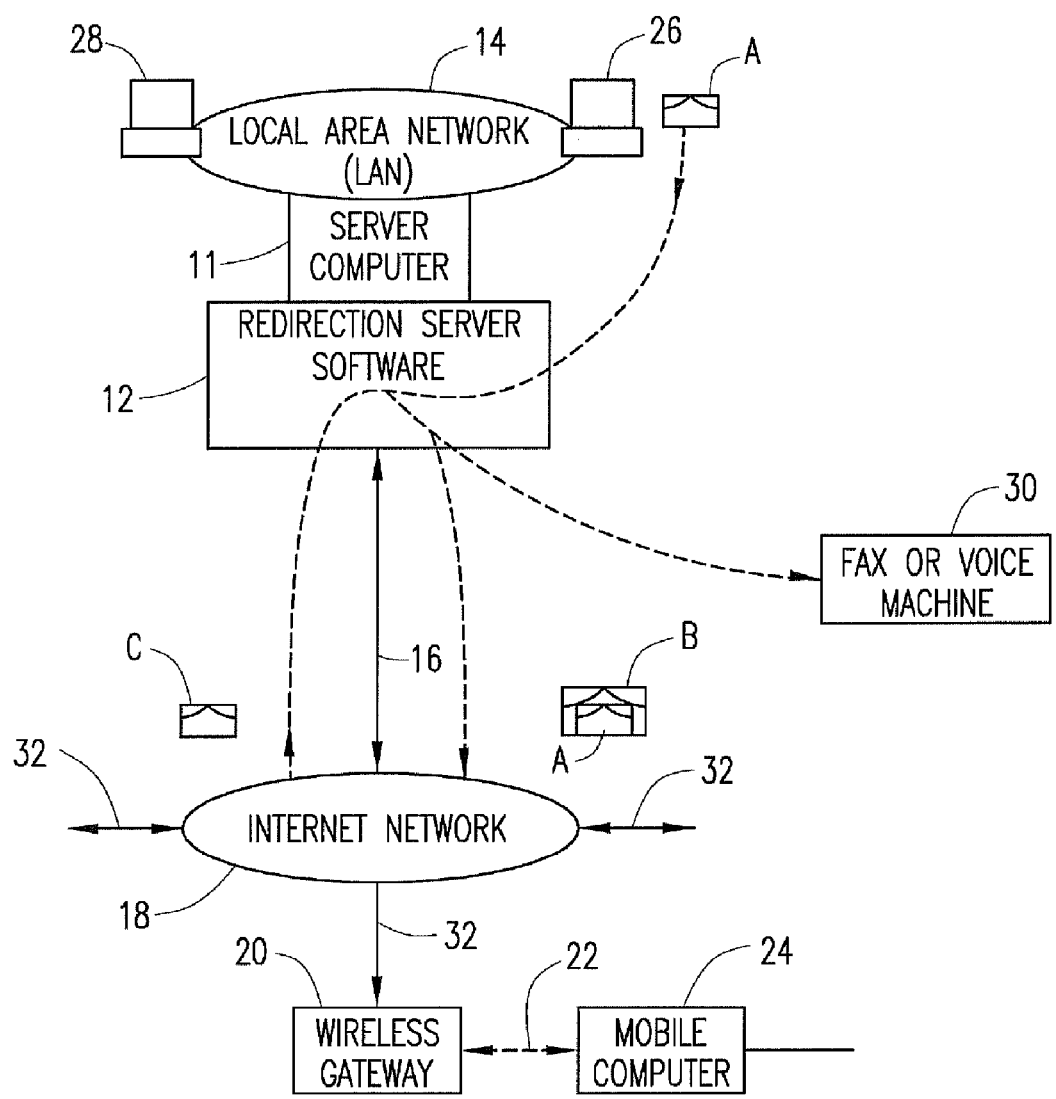
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
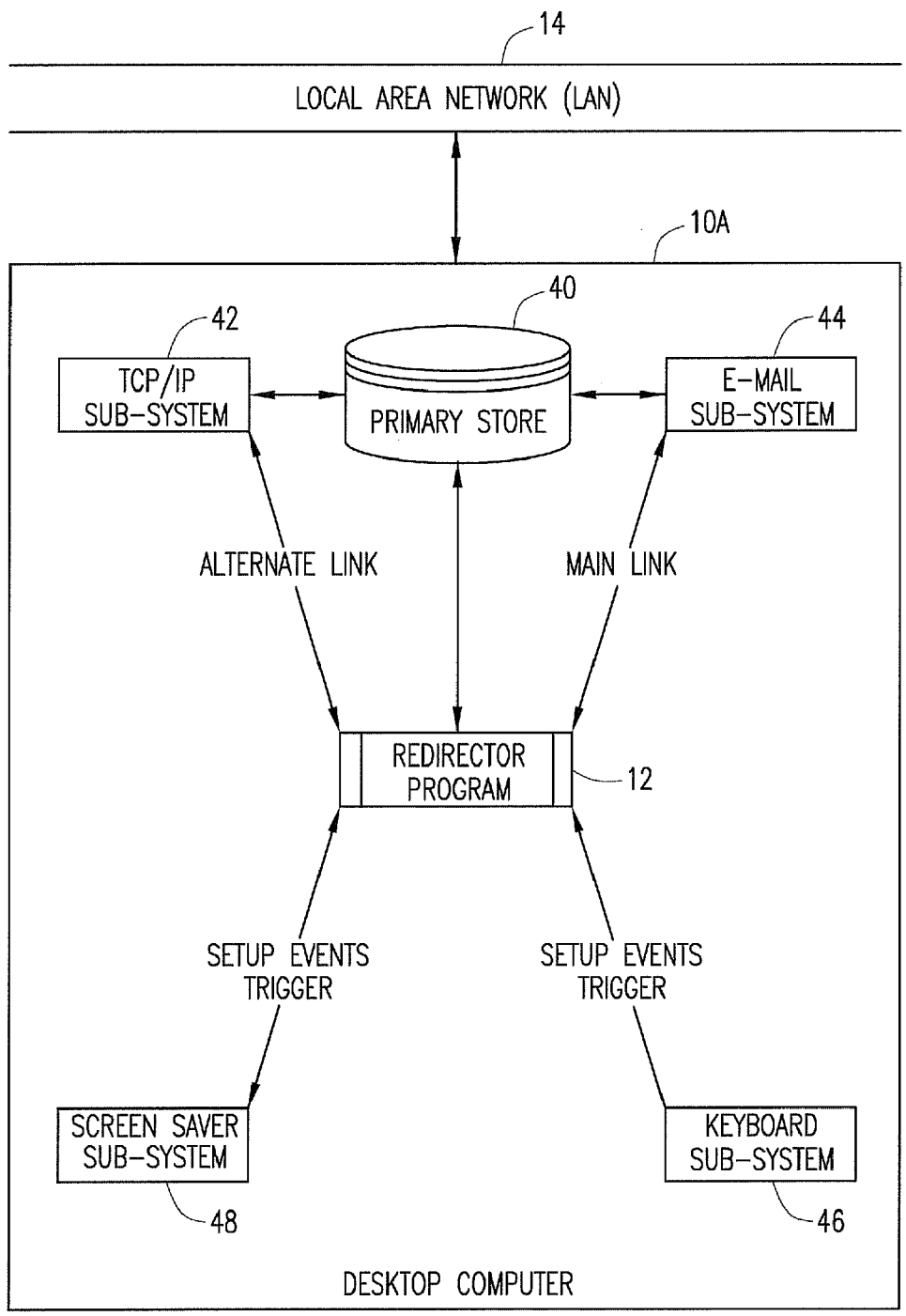
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10. In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, 10 minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
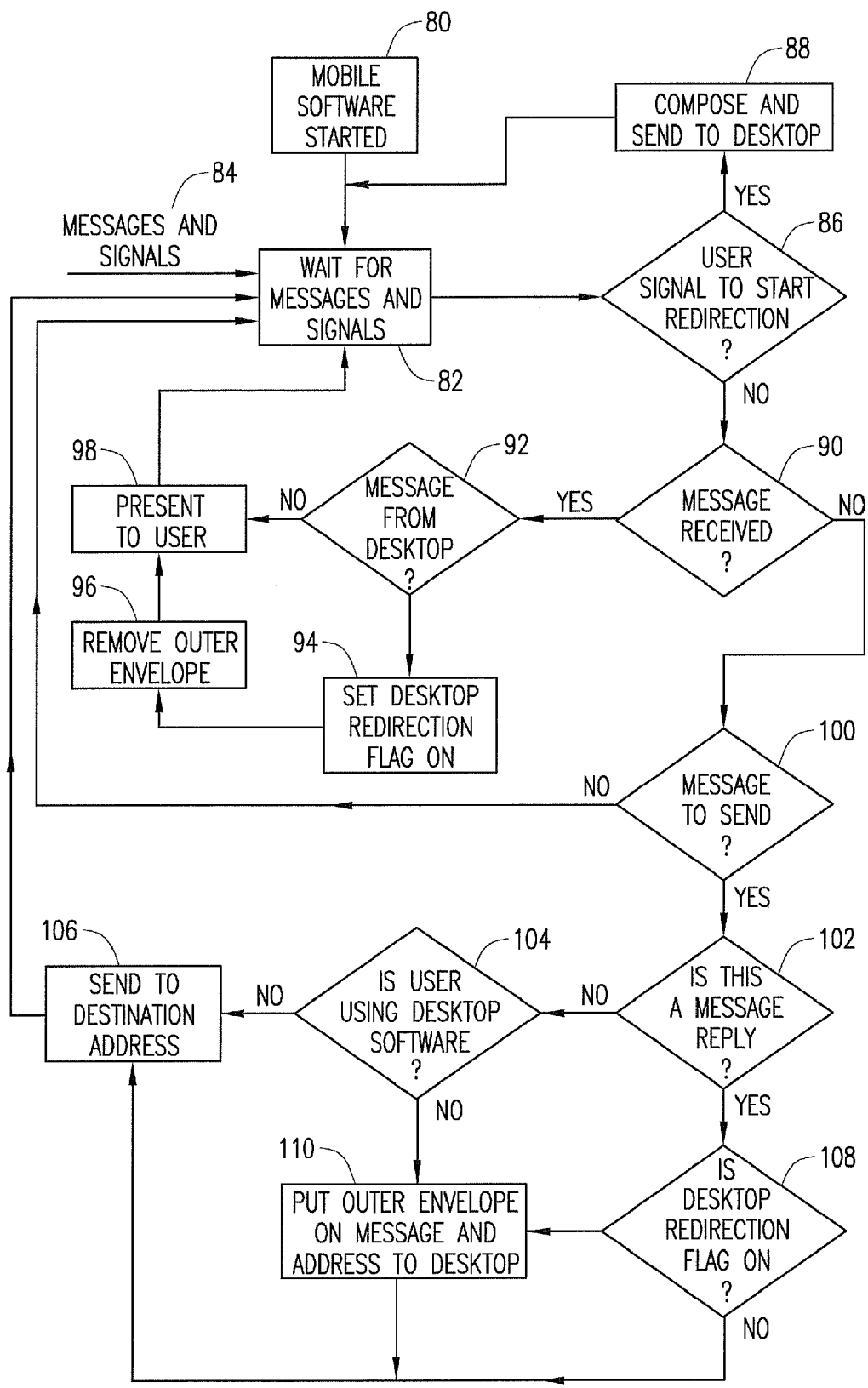
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine

10. In this situation where the mobile device 24 is sending a message directly to the desktop system 10, no outer wrapper is added to the message (such as message C in FIGS. 1 and 2).

In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile device returns to step 82 and waits for additional messages or signals.

Organizing and storing messages in the mobile device 24 and the host system 10 is set forth in FIGS. 6 through 18. The mobile device 24 preferably includes a hierarchical folder system, as does the host system 10. The user can select from multiple levels of folders to find a certain folder. For example, the user can organize messages into categories such as friends, co-workers, contacts, and "to do" list on the mobile device 24 and at the host system 10. Software on the mobile device 24 and the host system 10 organizes the messages so that filing a message on either the mobile device 24 or the host system 10 will be recognized at the other end either by commands sent through the redirector program or by synchronizing the mobile device with the host system. Synchronization can occur, for example, by plugging the mobile device into an interface cradle coupled to the host system or through a wireless device-to-host interface.

Figure 6:
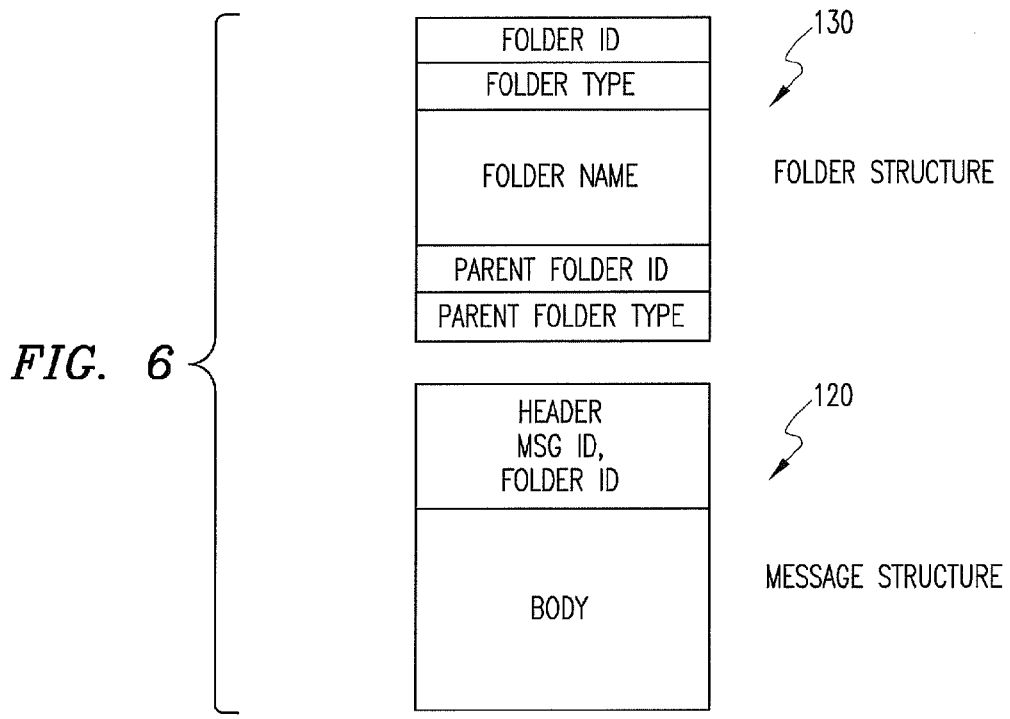
FIG. 6 is a schematic diagram of the logical structure of a folder and a message.

FIG. 6 sets forth a preferred message structure 120 and folder structure 130 for messages and folders that are stored on the host system 10 and the mobile device 24. The message structure 120 includes a message body and a message header. The message header preferably includes tags such as a message ID and a folder ID. The message ID is a unique tag that is associated with a single message. The message ID is assigned to a message when the message is received in the store. The folder ID is a tag that contains the unique ID of the folder in which the message is to be stored.

The folder structure includes a folder ID, folder type, folder name, parent folder ID, and parent folder type. The folder ID is a unique tag for each folder. The folder ID is generated when the mobile device 24 is synchronized to the host system 10. The folder type specifies attributes of the folder that differentiate it from other folders. One such folder could be a deleted items folder. The deleted items folder could be set to automatically purge messages after a given time. The folder name is the name of the folder that will be displayed on the device 24 or the host system 10. The parent folder ID is the folder ID of the folder that is one level above the current folder in the hierarchical system. The parent folder type specifies attributes of the parent folder that differentiates it from other folders.

Figure 7:
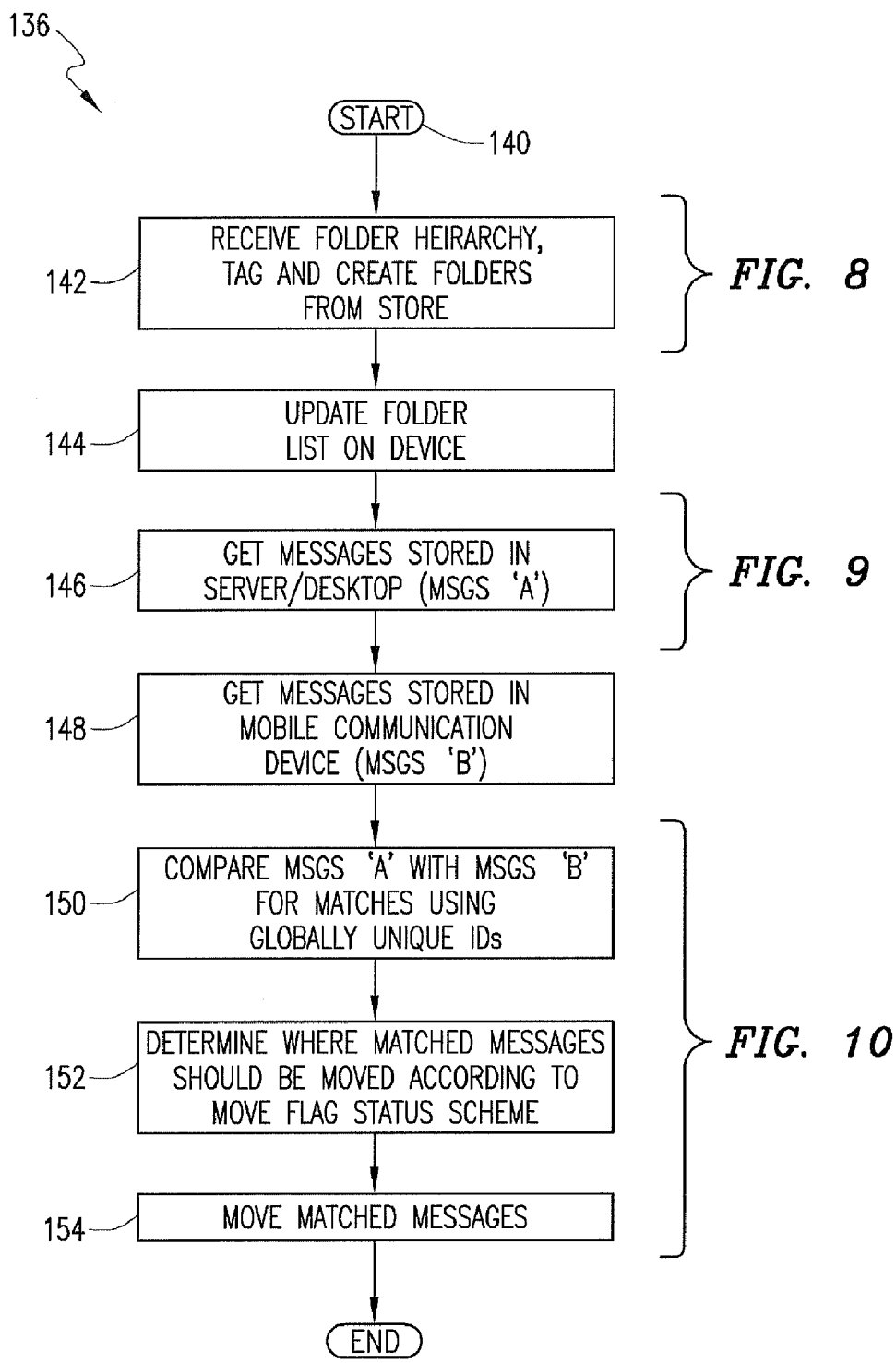
FIG. 7 is a flow chart showing the steps of synchronizing folders and messages between the host system and the mobile data communication device.

FIG. 7 is a flow chart illustrating the basic steps of synchronizing folders and messages between the host system 10 and the mobile device 24. Synchronization starts in step 140 when the mobile device 24 is coupled to the host system 10 by, for example, (1) placing the device in an interface cradle or a suitable equivalent; or (2) initiating an over-the-wireless-network synchronization. In this step, the folder hierarchy is received and tagged and the folder list is created in step 142 from a store at the host system 10. In step 144, the mobile device 24 is updated using the list of folders from the store. After the folders on the mobile device are updated 144 to match the folder structures 130 in the host system 10, the messages stored in the host system 10 are retrieved in step 146. The messages in the mobile device 24 are similarly retrieved in step 148. Step 150 compares the unique message IDs of messages in the mobile device 24 and the host system 10 to find similar messages. Once similar messages are found on the mobile device 24 and the host system 10, step 152 determines whether or not a message has been moved within the folder system. When one of the two messages (host message and mobile device message) is determined to have been moved, the other message is moved to the folder that matches the folder ID of the moved message in step 154. All similar messages from the mobile device 24 and the host system 10 are checked to determine 152 where the messages should be placed and moved 154 accordingly.

The folder structure synchronization process 136 first synchronizes the folder hierarchy of the mobile device 24 to the hierarchy of the host system and then moves a message that the user has filed in a folder on the mobile device 24 to the corresponding folder on the host system 10. Correspondingly, when the user has filed a message in a folder on the host system 10, the folder structure synchronization process 136 will move the message to the corresponding folder on the mobile device 24. This is advantageous, for example, for a user who uses his default message receive folder (inbox) as a measure of incomplete and complete jobs. It also eliminates the need to deal with the message a second time once the user returns to the office and uses primarily the host system and the associated folder structure therein.

Figure 8:
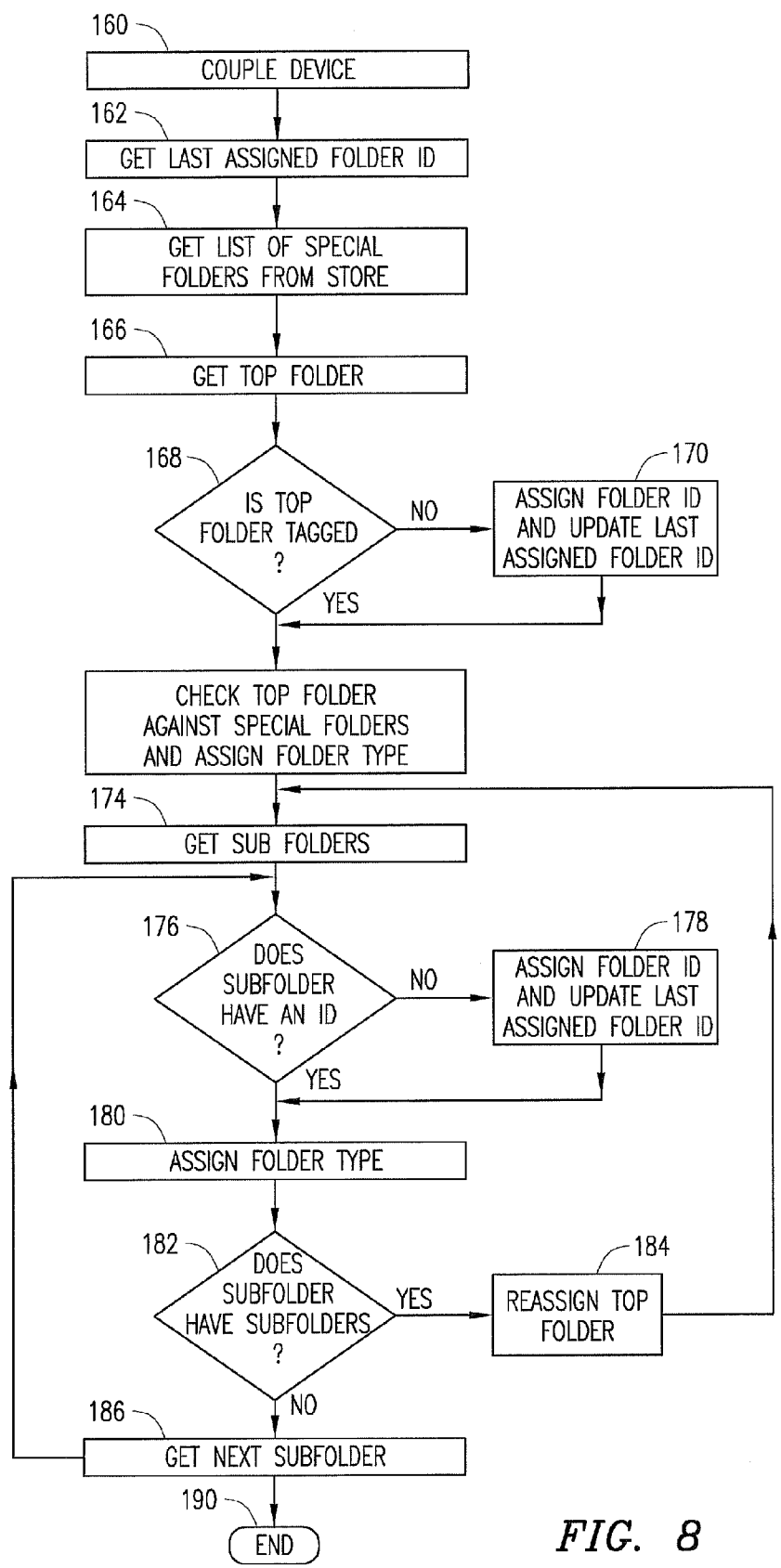
FIG. 8 is a flow chart showing the steps of assigning IDs to folders.

FIGS. 8 through 18 illustrate in more detail the steps required to synchronize the messages and folders of the mobile device 24 to the host system 10. FIG. 8 sets forth the method steps carried out by the host system 10 to assign folder IDs to the folders (step 142 from FIG. 7). When the mobile device 24 is coupled with 160 the host system 10, the last assigned folder ID is retrieved from the mobile device 24 at step 162. A "special" folder list is retrieved in step 164 from the store of the host system 10. A "special" folder is a folder such as a deleted folder or an inbox folder where specific rules are set for managing messages within the folder. Based on the hierarchical structure, the host system 10 gets the top folder in step 166 and checks if the top folder is flagged in step 168. If the top folder is not flagged, step 170 assigns a folder ID to the folder based on the last assigned number retrieved in step 162. Once the top folder is assigned an ID number, the top folder is checked against the special folders and assigned a folder type in step 172.

By continuing to select through the hierarchical folder structure, step 174 retrieves subfolders of the top folder. The subfolder is checked for a folder ID in step 176 and assigned a folder ID in step 178 if no folder ID is found in step 176. Step 180 assigns a folder type to the subfolder. Step 182 checks for a subfolder underneath the current folder. If another subfolder is found, it is assigned as the top folder in step 184 and returned to step 174. If there are no more subfolders underneath the current subfolder, step 186 retrieves the next subfolder and returns the retrieved subfolder to step 176. Once the last subfolder is retrieved, step 190 ends the tag and retrieve step 142 of the folder structure synchronization process 136. Overall, this is a recursive operation performed for all the subfolders starting from the top folder of the information store.

Figure 9:
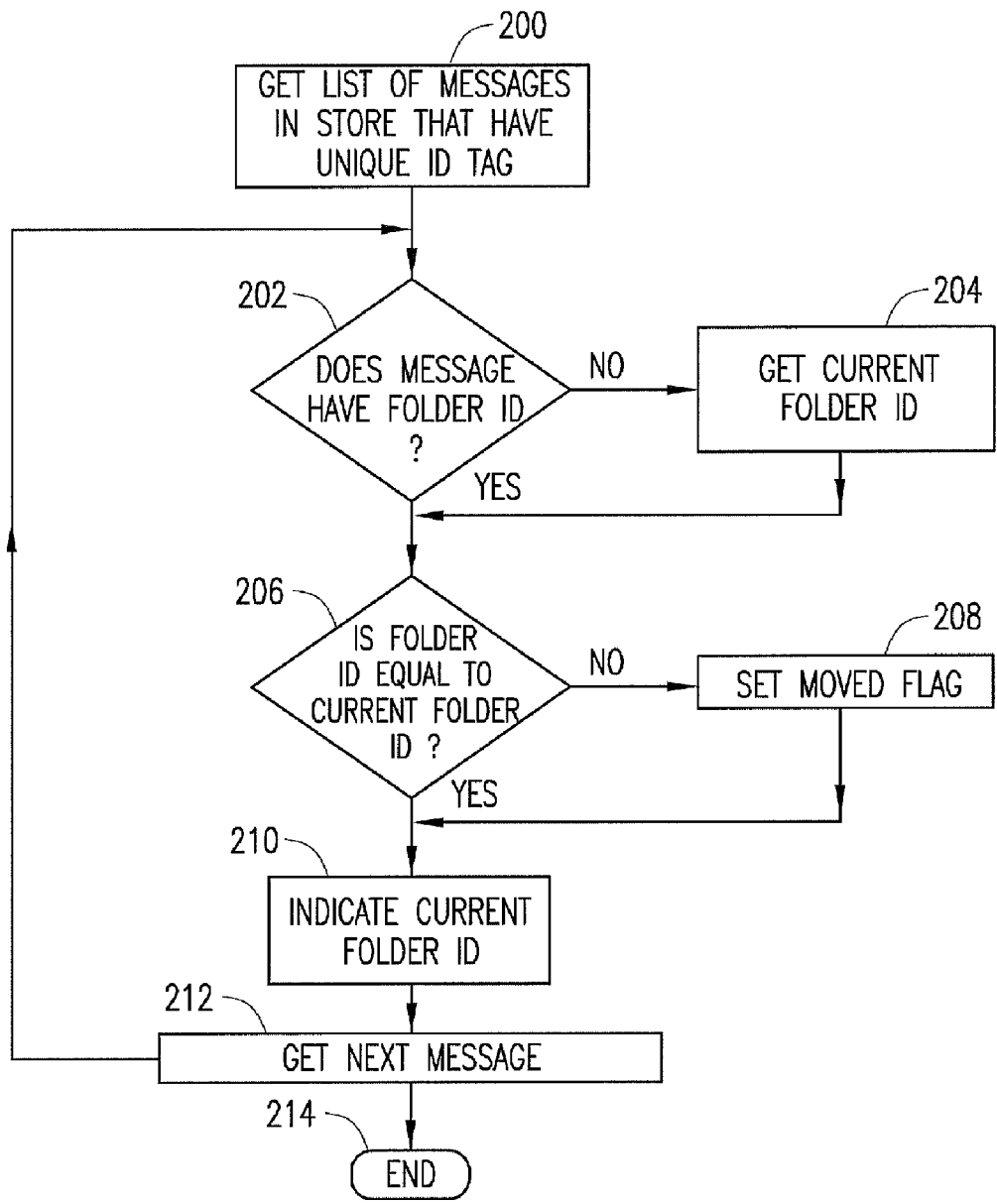
FIG. 9 is a flow chart showing the steps of retrieving messages from the store.

FIG. 9 sets forth the steps of retrieving the messages from the host system 10 as shown in step 146 of FIG. 7. Step 200 retrieves the list of messages from the store that have the unique IDs assigned to them. The message is checked for a folder ID in step 202. If a folder ID is not assigned, the current folder ID is assigned to the message in step 204. Step 206 checks the folder ID of the message against the current folder ID to see if they match. If the current folder ID and the folder ID on the message do not match, a move flag is set in step 208. The current folder ID is indicated in step 210, the next message is retrieved in step 212, and the next message is returned to step 202. Once all messages with unique IDs have been retrieved in step 212, the process ends in step 214. The list of messages with unique IDs retrieved from the store is referred to as messages 'A'.

The steps set forth in FIG. 9 are repeated for the mobile device 24. The messages from the mobile device 24 are referred to as messages 'B'. Once these steps have been accomplished, the folder structure synchronization process 136 includes a list of all unique messages 'B' and 'A' in the mobile device 24 and the host system 10, respectively. For each message in the list, a move flag is either on or off. The move flags of equivalent messages in the set of messages 'A' and 'B' are compared in FIGS. 10A and 10B to determine the proper folder placement of the message.

Figure 10A:
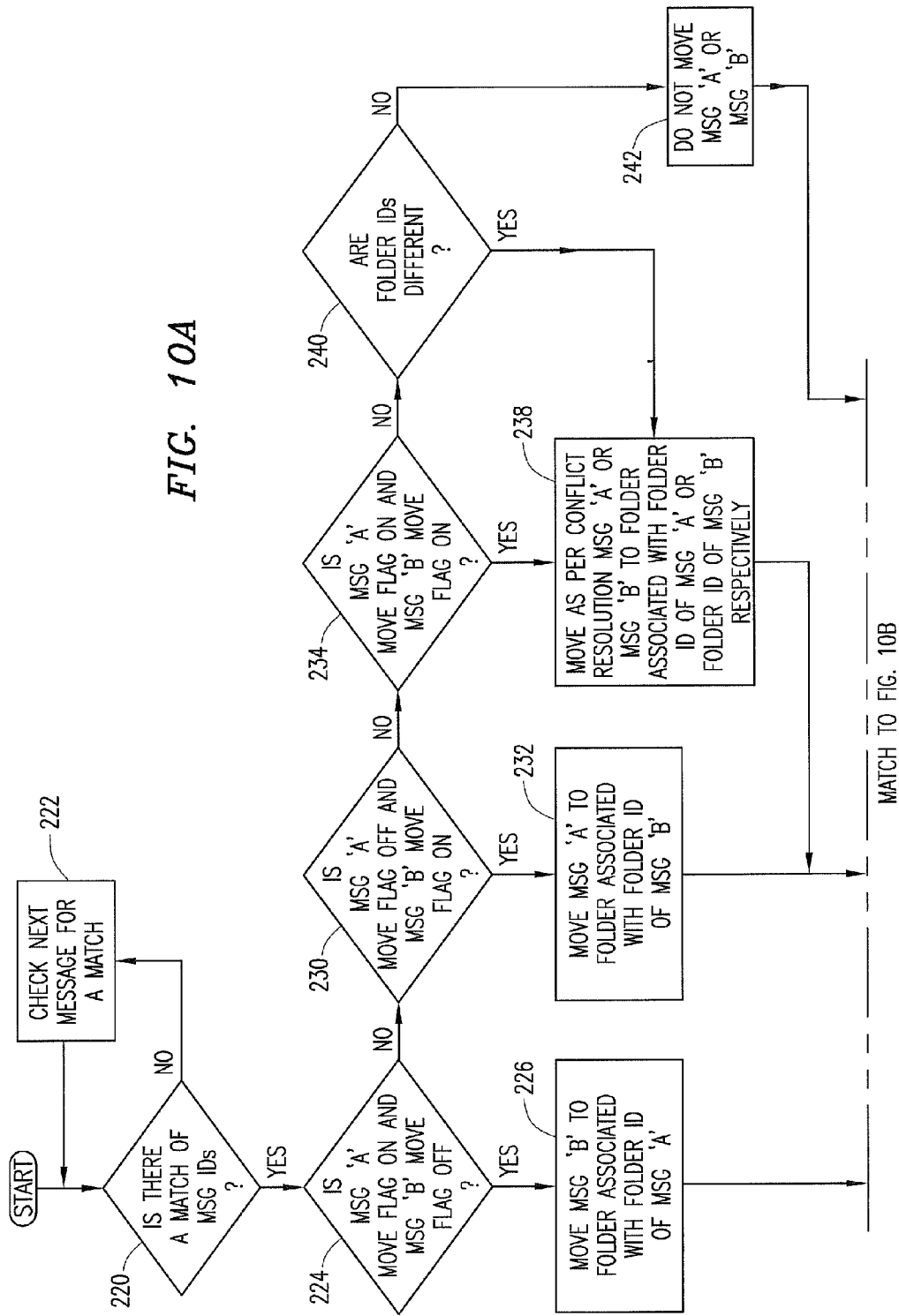
FIGS. 10 A and B is a flow chart more specifically showing the steps of synchronizing messages between the host system and the mobile data communication device.
Figure 10B:
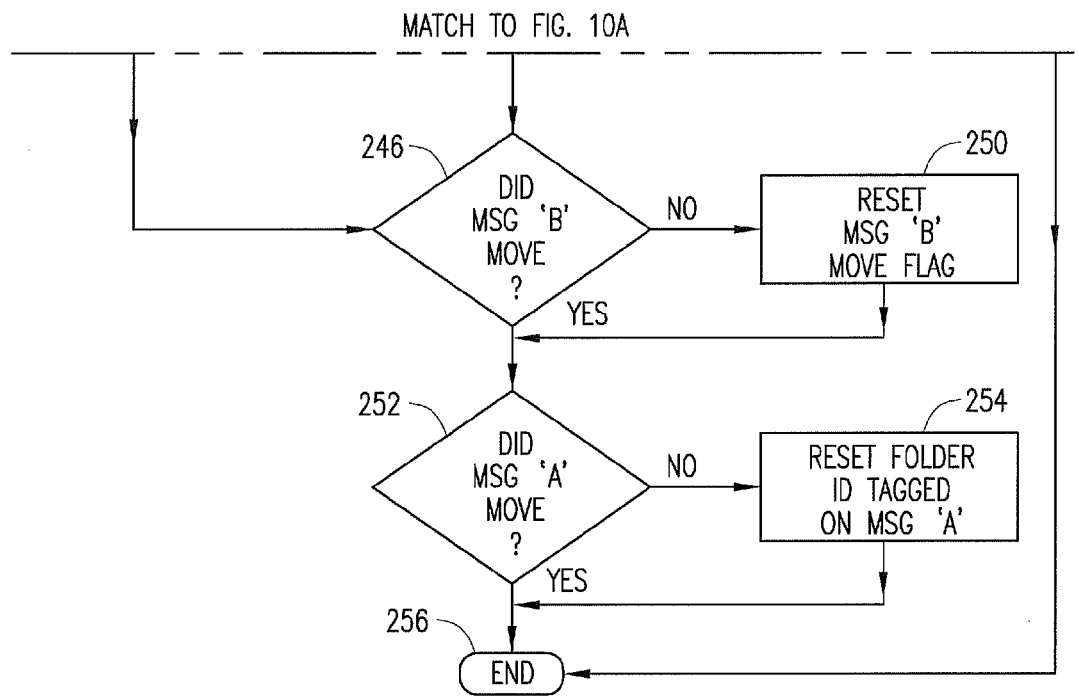

FIGS. 10A and 10B set forth the steps of synchronizing the messages between the host system 10 and the mobile device 24. Step 220 of FIG. 10 checks to see if there is a match between the message IDs of the current message 'A' and the first message 'B'. If the IDs do not match, step 222 updates message 'B' to the next message in the list of 'B' messages. Once a matching message is found, step 224 checks if the move flag for message 'A' is on and the move flag for message 'B' is off. If this is the case, message 'B' is moved to the folder having the folder ID of message 'A' on the mobile device 24 in step 226. If the move flag status is not equal to the check in step 224, step 230 checks for a different flag status.

Step 230 checks if the move flag for message 'B' is on and the move flag for message 'A' is off. If this is the case, message 'A' is moved to the folder having the folder ID of message 'B' on the host system in step 232. If the move flag status is not equal to the check in step 230, step 234 checks for move flags in both message 'A' and message 'B' to be on. If both flags are on, step 238 decides which message to move based on a conflict resolution structure. The conflict resolution structure is a predetermined rule where the software moves one of the messages based on the folder ID of the other message. If both flags are off, step 240 checks to see if the folder IDs of message 'A' and message 'B' are different. If the folder IDs are different, the conflict resolution structure of step 238 decides which message to move. If the folder IDs are the same, messages 'A' and 'B' remain in their current folders as shown in step 242.

Step 246 checks if message 'B' was moved. If message 'B' was not moved, the message 'B' move flag is reset in step 250. Message 'A' is checked in step 252 to see if it moved. If message 'A' did not move, the move flag for message 'A' is reset 254. This is accomplished by updating the folder ID on message 'A' with the folder ID that was found in during step 210. The procedure for checking the move status of the messages is completed in step 256.

Figure 11:
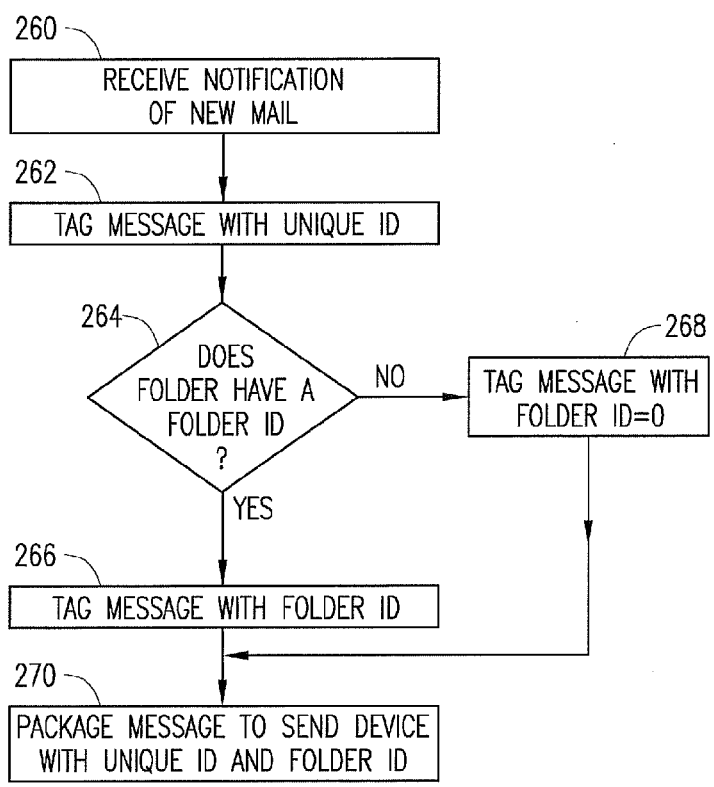
FIG. 11 is a flow chart showing the steps of attaching a folder ID to a message.

FIG. 11 sets forth the preferable method steps of assigning an ID to a newly received message at the host system for redirection. When a new message is received in step 260, the message is tagged with a unique ID in step 262. Once the message has a unique ID, step 264 checks if the folder in which the message is to be stored has an assigned folder ID. If the folder has an ID, the folder ID of the message structure 120 for the new message is set to the folder ID value in step 266. If the folder does not have an ID, the folder ID of the message structure 120 for the new message is set to zero as shown in step 268. After the folder ID has been set in step 266 or 268, the message is sent to the device by the redirector in step 270.

The user has the option to move a message between folders on either the mobile device 24 or the host system 10. For example, a user who has a "to do" folder on both the host system 10 and the mobile device 24, might receive a message on the mobile device 24 when he is away from his host system 10. The redirector program might be instructed to place incoming messages into an Inbox folder on the device. After reviewing the message, the user decides to file the message into the "to do" folder on the mobile device 24. The software system for organizing messages and folders on the mobile device 24 sends a move signal to the host system 10 to move the same message to the "to do" folder on the host system. Later, the user decides to move the message again to a "completed tasks" folder which also resides on both the mobile device 24 and the host system 10, but this time the user initiates the move at the host system 10. The host system 10 sends a move signal to the mobile device 24 to initiate the same move on the mobile device 24. This method and system of moving messages between folders on the host system 10 and the mobile device 24 employs the "push" paradigm of the redirector software. The method steps for moving the message between folders are shown in FIG. 12 and the method steps of FIGS. 13-17 show the steps taken at the host system 10 and the mobile device 24 when the user has initiated a move on at either the host system or mobile device.

Figure 12:
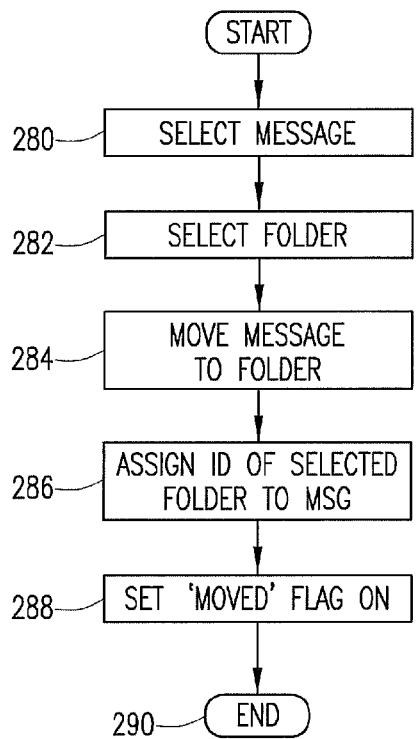
FIG. 12 is a flow chart showing the steps of moving a message locally on a device.

As shown in FIG. 12, to file a message on the mobile device 24, the message is selected in step 280: A folder to place the message is selected in step 282. The selected message is moved to the selected folder in step 284. The folder ID of the selected folder is assigned to the folder ID of the message structure 120 for the selected message in step 286 and the move flag status is set in step 288. Finally, the message has been properly moved and the steps end at step 290.

Figure 13:
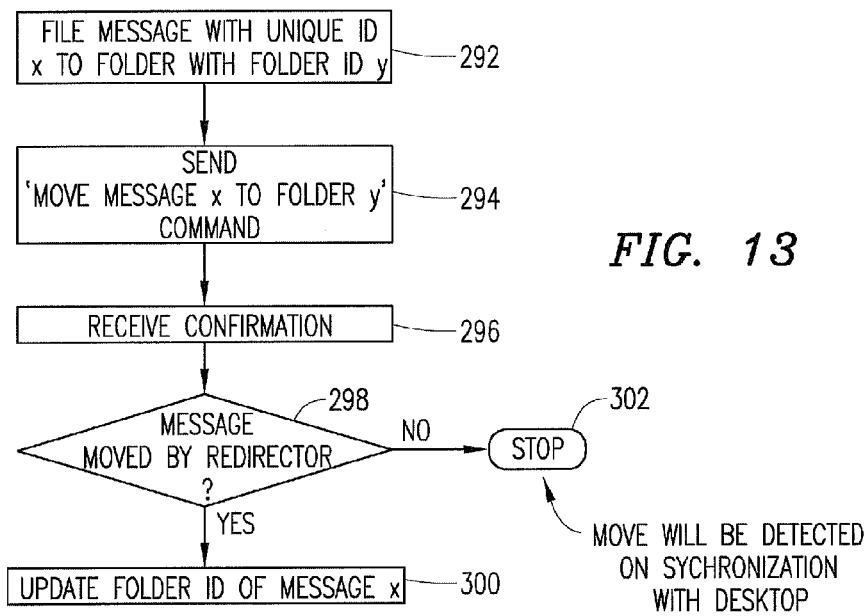
FIG. 13 is a flow chart showing the steps of sending a move message to the host system after a message has been moved on the mobile device.
Figure 16:
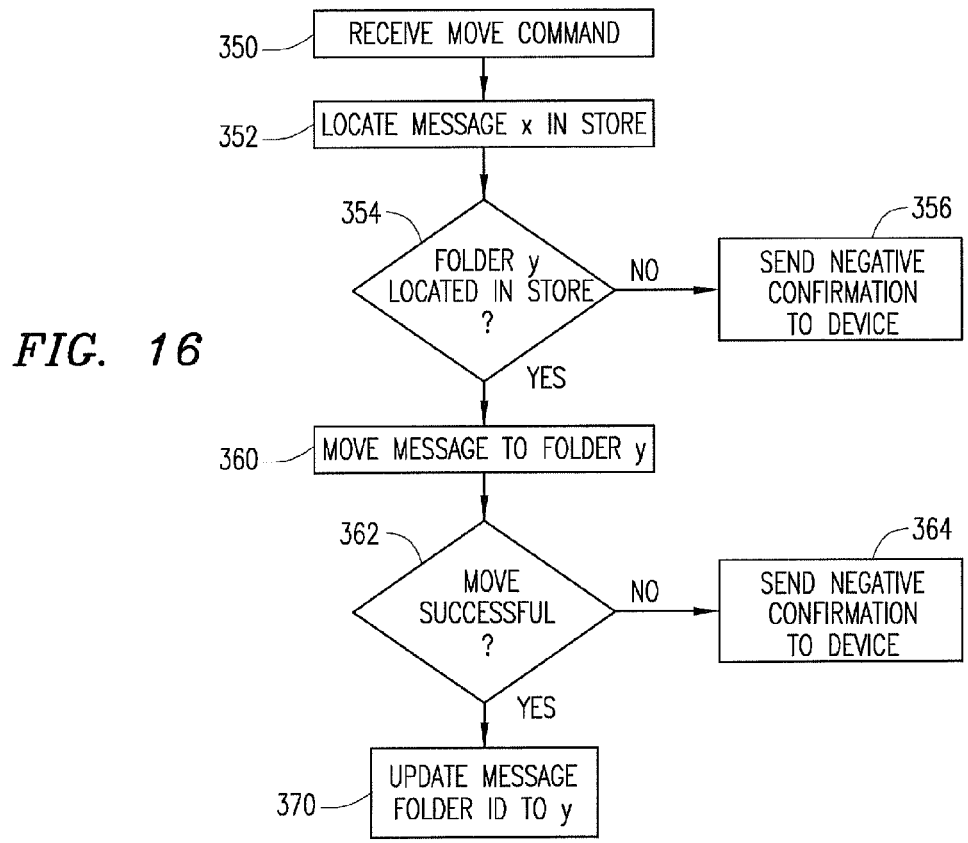
FIG. 16 is a flow chart showing the steps of acting upon the message move command of FIG. 14.

Once the message has been moved on either the mobile device 24 or the host system 10, the redirector preferably attempts to move the identical message to the corresponding folder on the other end to provide a true mirrored (i.e., synchronized) organization of information as illustrated in FIGS. 13 and 16. Shown in FIG. 13 are the preferred steps in sending a move signal from the mobile device 24 to the host system 10 via the wireless network 22 as disclosed herein. The preferred steps are referred hereinafter to as the "over-the-air-move" process. After the message has been moved in step 292 of FIG. 13, step 294 sends a command to move the message x to the folder y and waits for a confirmation signal in step 296. Step 298 checks if the redirector successfully moved the message. If the message was moved, the folder ID of message x is updated in step 300. If the message was not moved, then the redirector proceeds with its normal operation in step 302, and the message will be moved during synchronization.

The over-the-air-move process is preferably in the control of the user. In circumstances where the user desires to limit bandwidth consumption, it may be desirable to switch the over-the-air-move feature off and to leave synchronization of information organization until device-host synchronization through the wired interface cradle. In another embodiment of the present invention, the mobile device 24 bundles together and compresses the various move commands (or other operations) created during the day and transmits the same during non-peak transmission times. These steps are presented in detail in FIGS. 21 through 24.

Moving a message on the mobile device 24 requires a move command to be sent to the host system 10 as described above. But, moving a message on the host system requires both checking to see if the message was redirected to the mobile device 24 and if the folder the message was moved to exists on the mobile device 24. These steps are set forth in FIG. 14. Once the redirector has received a move message command from the host system 10 that a message has been moved in step 304, the redirector checks to see if the message has been redirected to the device in step 306. If the message was not redirected to the mobile device 24, the redirector does not attempt to send the move command and proceeds with its normal operation at step 308. If the message was delivered to the mobile device 24, then step 310 determines if the folder that the message was moved to has a folder ID. The folder may not have an ID if, for example, the user created the folder at some point after the last synchronization. If the folder does not have a folder ID, the redirector does not forward the move message command and the redirector proceeds with its normal operation at step 314. The move will be made when the mobile device 24 and the host system 10 are synchronized and the folder with the correct folder structure 130 is generated.

If the folder ID does exist for the folder, then the move message command is sent in step 316. The redirector awaits acknowledgement of the move in step 318. If the acknowledgement is not received, the redirector proceeds with its normal operation at step 320, or alternatively, attempts to retransmit the move message command. If acknowledgement of the move is received, step 322 tags the message with the current folder ID.

FIG. 15 shows the steps performed at the mobile device 24 when a move message command is received from the host system 10. Similarly, FIG. 16 shows the steps performed at the host system 10 when a move command is received from the mobile device 24. Both functions require (1) receiving a move command, (2) checking to see if the command may be executed, and (3) reacting with a negative confirmation or moving the message and positively confirming.

Step 330 of FIG. 15 occurs when the mobile device 24 receives a move command. Step 332 checks if the folder exists on the mobile device 24. If the folder does not exist, a negative confirmation is sent to the host system 10 in step 334. Otherwise, the mobile device 24 is tagged 336 with the new folder ID, the message's folder ID is updated in step 338, and a positive confirmation is sent to the host system 10 in step 340.

FIG. 16 shows the steps of acting upon a move message command at the host system 10. The move command is received 350. Step 352 locates the message in the store. Step 354 determines if the folder is located in the store. If the folder is not located in the store, a negative confirmation is sent to the mobile device 24 in step 356. If the folder is located in the store, the message is moved 360 to the folder. Step 362 determines if the move was successful. A successful move updates the message's folder ID in step 364 while an unsuccessful move sends a negative confirmation 370 to the mobile device 24.

Special folders can require a special set of instructions to deal with message management. For example, a deleted folder can be created to detect deletions at either the mobile device 24 or the host system 24. When the message is deleted, the redirector must check to see if the user has previously chosen to delete messages off of both the mobile device 24 and the host system 10 when it is deleted on one of these two.

Figure 17:
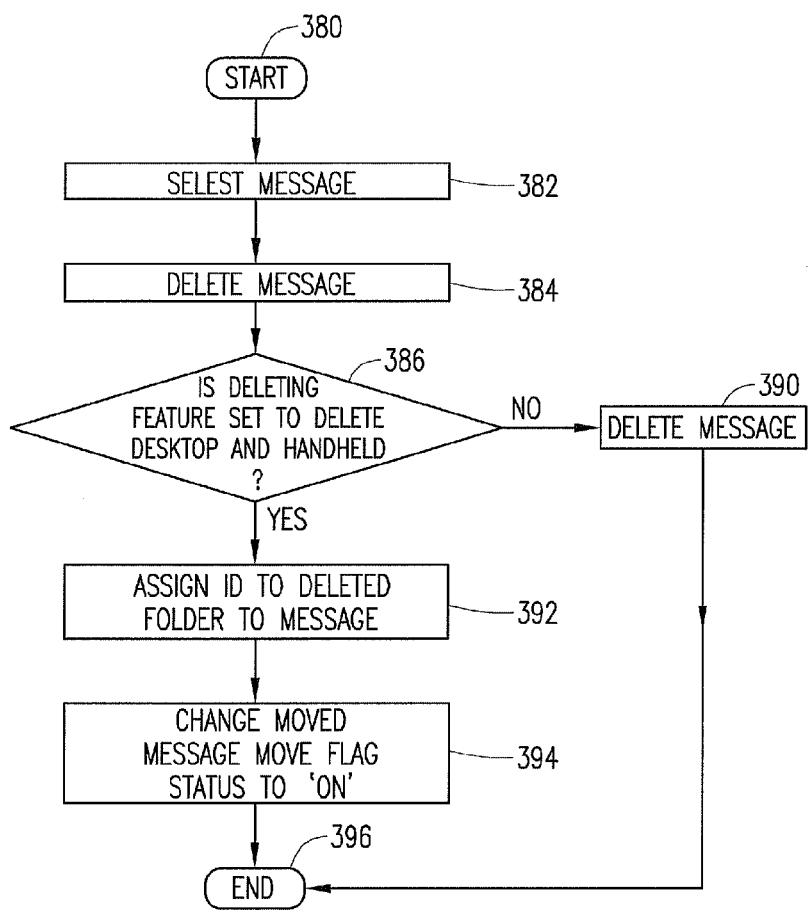
FIG. 17 is a flow chart showing the steps of deleting a message.

The steps set forth in FIG. 17 show how the device accordingly handles a delete request. The delete process is started 380 when the user has selected a message for deleting. The message is selected 382 and then deleted 384 by the software on the mobile device 24. The software on the device then determines 386 if the delete feature is set to delete messages on both the mobile device 24 and the host system 10. If the delete-feature is not set for the host system and the device, the software simply deletes the message locally 390. If the delete feature is set for the host system and the device, the folder ID of the deleted folder is assigned to the message in step 392. The move flag for the message is set on 394 so that the deletion can be detected on the other device. The delete process is completed 396. In the case where the user deletes a message on the host system, the deletion of that message will be reflected upon synchronization.

Figure 18:
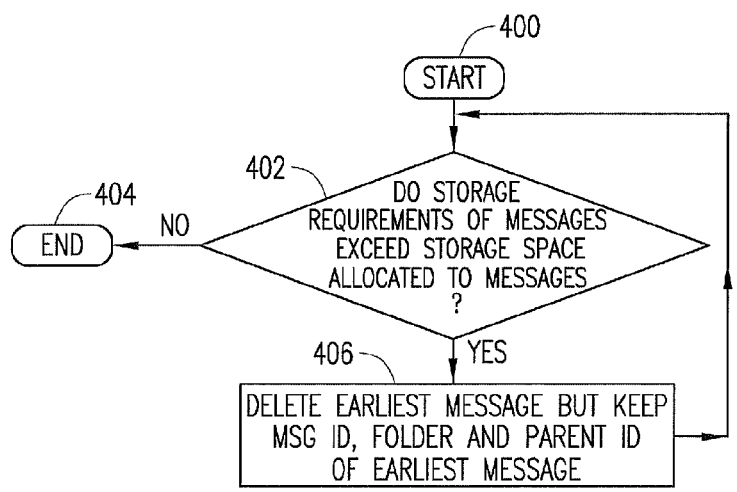
FIG. 18 is a flow chart showing the steps of purging a message.

Finally, the folder management system controls wasted use of resources by purging the earliest messages once allocated space is exceeded, as shown in FIG. 18. The purge process is started in step 400. The software determines 402 if storage requirements exceed the storage space allocated for messages. If the storage requirements are not exceeded, the purge process is ended 404. If the storage space is exceeded the earliest message is deleted, but the message structure 120 is retained in step 406.

Figure 19:
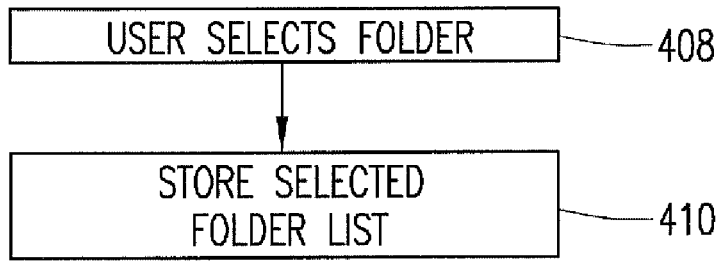
FIG. 19 is a flow chart showing the steps of generating a folder list for redirecting messages received at a store.
Figure 20:
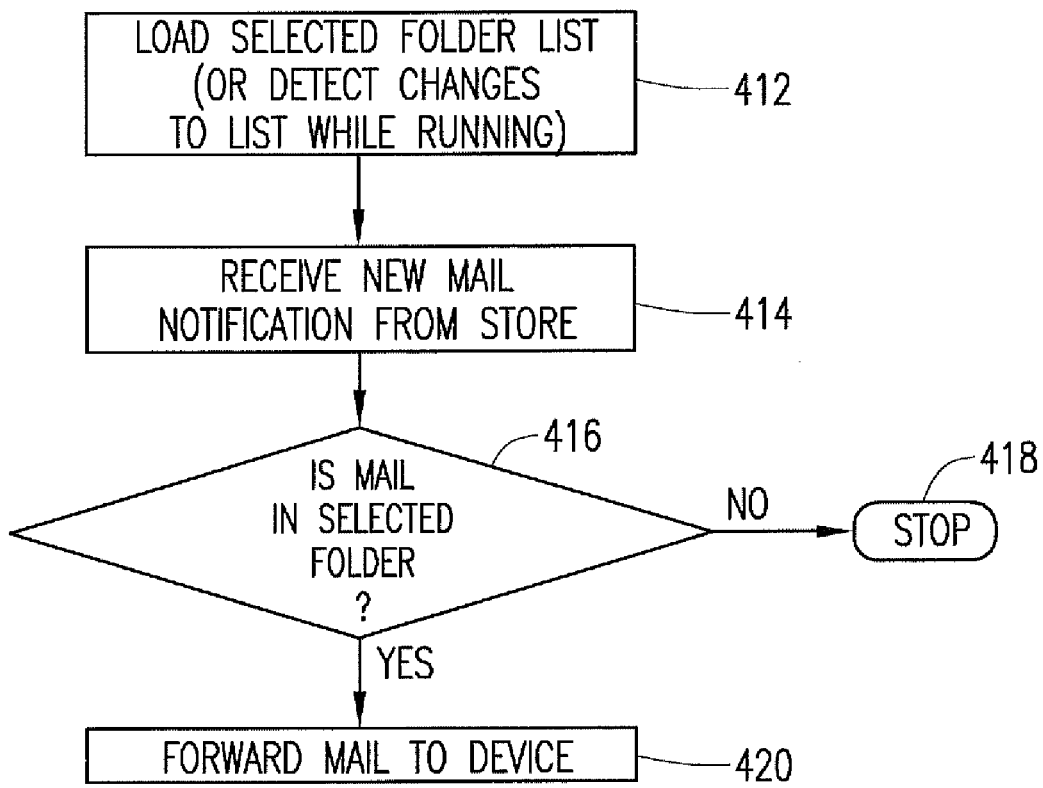
FIG. 20 is a flow chart showing the steps of redirecting a message received and filed in the folder list of FIG. 19.

FIGS. 19 and 20 set forth a method of using folder lists as a trigger source for the redirector program 12. In FIG. 19, the user selects 408 a folder and the folder is stored 410 in the folder list. FIG. 20 shows the steps set forth for forwarding a message based on the folder list. The message could, for instance be a new piece of mail. The folder list is loaded 412. A new mail notification is received 414. The software checks if the mail is in a folder from the folder list in step 416. If the mail is not in a folder listed in the folder list, the process stops 418. If the mail is in a folder listed in the folder list, then the redirector forwards the message to the mobile device 24 in step 420, as described above.

In another aspect of the present invention, wireless mobile data communications devices, especially those that can return a confirmation signal to the host that the pushed data has been received, are utilized in conjunction with the redirector program. It is also possible for the mobile data communications device to include additional information with the confirmation signal, including, any one or more of the following actions, the fact that the message: has been read (the information associated therewith is a "read signal"); has been filed in a specific folder (the information associated therewith is a "filed signal"); has been forwarded to another recipient (the information associated therewith is a "forward signal"); or, has been replied to (the information associated therewith is a "reply signal"). These actions can then be synchronized with the host system, thus eliminating the need for the user to perform these actions a second time.

Traditionally, message status icons are associated with messages at the host system 10. A message status icon is a graphical image indicating the state of the message. States may indicate that: a message is new, a message has been read, a message has been deleted, a message has been forwarded, a message has been replied to, a message has been filed or any combination thereof. The message status icon is preferably in close physical proximity, when viewed by the user as a list of messages, to the corresponding message and other corresponding message details (such as subject, sender's name, arrival time, etc.) in the graphical user interface. By way of example, if a user at the host system forwards a message from the host system to another party, the message status icon will be altered in appearance to indicate to the user a forwarding action has been applied to that particular message. In this manner and advantageously, the user has a quick visual method of reviewing a list of messages in a folder and the states of the messages, thereby knowing the actions that have already taken place with respect to those messages at the host system 10.

In accordance with the present invention and preferably, as a consequence of receiving at the host system 10 at least one of a plurality of action signals from the mobile 24 (i.e., a read signal, a filed signal, a forward signal or a reply signal), a graphical change will occur at the host system 10 to a message status icon, which is associated with the message acted upon at the mobile, to indicate to the user upon his return and access to the host system that the message has been acted upon (i.e., read, replied to, forwarded and/or filed, etc.) at the mobile. The graphical change will result in a second message status icon distinguishable from the first message status icon and, preferably, the graphical representation of the second message status icon clearly illustrates the state of the message. In one embodiment of the present invention and preferably, as a consequence of receiving a filed signal, the host system application associated with the message will move the message to the appropriate folder so that the user upon his return and access of the host system will see information organized in the same manner as in the mobile device. In the case of a filed message that is also read at the mobile, the corresponding message, at the host system, is moved and the message status icon associated therewith at the host system is altered to indicate the read status. Likewise, in the case where a message is read and forwarded to another party at the mobile, a single second message status icon will preferably represent both statuses (i.e., read and forwarded). Preferably, any second message status icon graphical representation resulting from an action event taking place at the mobile is the same graphical representation that would occur if the action event had been undertaken at the host system 10 rather than the mobile 24. Alternatively and at the user's control preferably, any graphical representation is clearly distinguishable as to be the status change resulting from an action taking place at the mobile versus an action taking place at the host system. In the latter embodiment, the user of the redirector system herein will have quick and reliable information as to where the message was read, filed, forwarded, or replied from. Preferably and where a read-receipt is requested by a sender of the message, upon receiving the read signal from the mobile, the redirector or any associated message application such MS Exchange™ or Lotus Notes™ will direct a read-receipt signal to the read-receipt requester.

In one embodiment of the present invention, the invention allows for a notification of the state of a redirected message at the mobile. It is to be understood that the status signals may be forwarded to the host system during other times as well, such as during synchronization or real-time over-the-air-moves as described below.

In another embodiment of the present invention, there is provided a method of indicating at the host system the state of the message at the mobile communications device. The steps of this method preferably include: (A) altering the state of a first message at the mobile communications device thereby creating an altered state; (B) forwarding a status signal to the host system; and, (C) changing at the host system a first message status icon based on the altered state at the mobile communications device. Therefore, according to one aspect of the invention, the message status icon change indicates an altered state of the message at the mobile communication device.

In another embodiment of the present invention, there is provided a method of indicating at the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device.

In one embodiment of the invention, there is provided a method of indicating at a first device such as a sender's host system or mobile device, via the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device; and (F) forwarding a read-receipt to a read-receipt requester's device.

Figure 21:
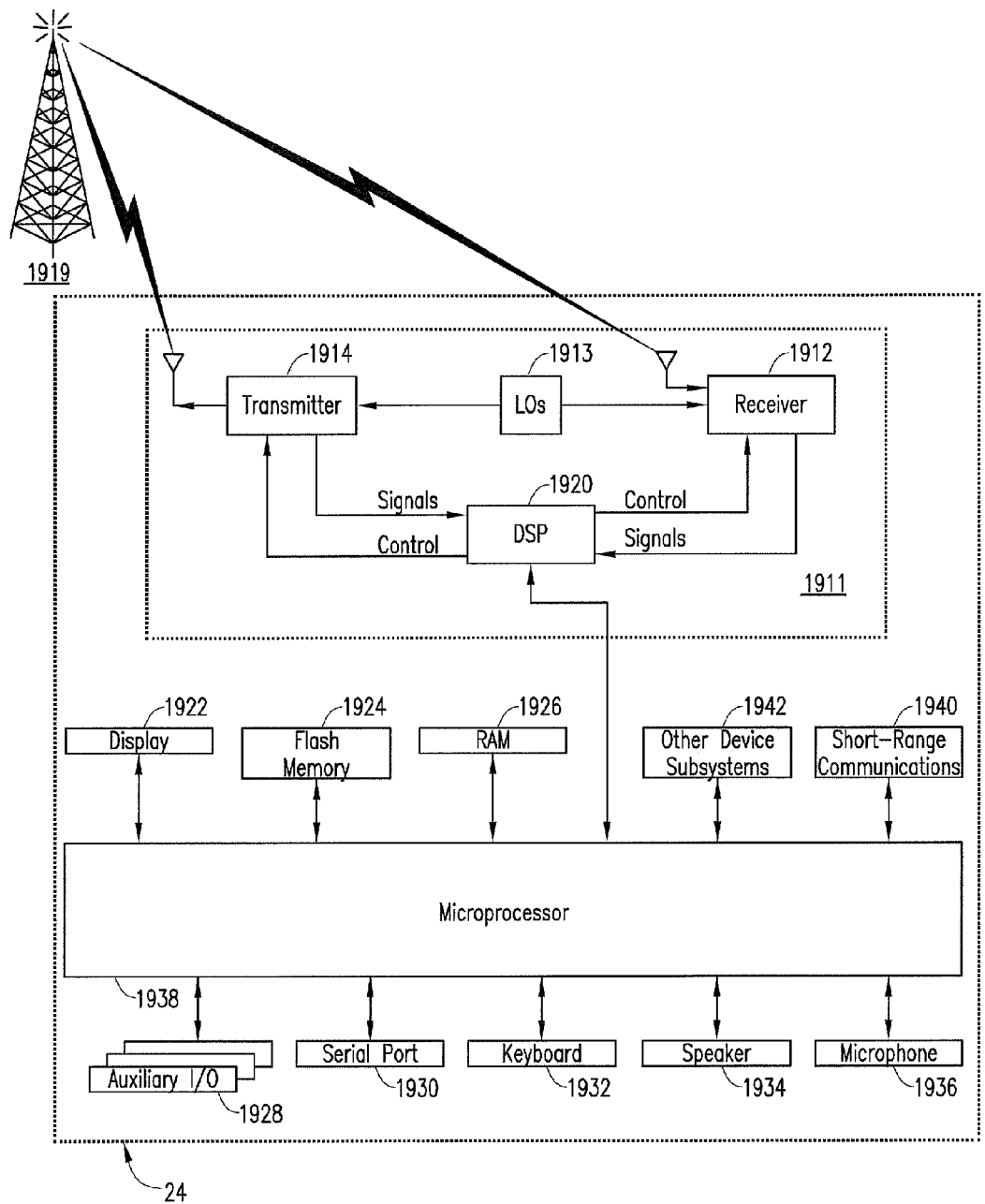
FIG. 21 is a block diagram of yet another mobile communication device 24 in which the instant invention may be implemented.

FIG. 21 is a block diagram of yet another mobile communication device 24 in which the instant invention may be implemented. The mobile communication device 24 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 24 is enabled for two-way communications, the device will incorporate a communication subsystem 1911, including a receiver 1912, a transmitter 1914, and associated components such as one or more, preferably embedded or internal, antenna elements 1916 and 1918, local oscillators (LOs) L 1913, and a processing module such as a digital signal processor (DSP) 1920. As will be apparent to those skilled in the field of communications, the particular design of the communication subsystem 1911 will be dependent upon the communication network in which the device is intended to operate. For example, a device 24 destined for a North American market may include a communication subsystem 1911 designed to operate within the Mobitex™ mobile communication system or DataTAC™ mobile communication system, whereas a device 24 intended for use in Europe may incorporate a General Packet Radio Service (GPRS) communication subsystem 1911.

Network access requirements will also vary depending upon the type of network 1919. For example, in the Mobitex and DataTAC networks, mobile devices such as 24 are registered on the network using a unique personal identification number or PIN associated with each device. In GPRS networks however, network access is associated with a subscriber or user of a device 24. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 24 will be unable to carry out any functions involving communications over network 1919. When required network registration or activation procedures have been completed, a device 24 may send and receive communication signals over the network 1919. Signals received by the antenna 1916 through a communication network 1919 are input to the receiver 1912, which may perform such common receiver functions as signal amplification, frequency down conversion, filtering, channel selection and the like, and in the example system shown in FIG. 19, analog to digital conversion. Analog to digital conversion of a received signal allows more complex communication functions such as demodulation and decoding to be performed in the DSP 1920. In a similar manner, signals to be transmitted are processed, including modulation and encoding for example, by the DSP 1920 and input to the transmitter 1914 for digital to analog conversion, frequency up conversion, filtering, amplification and transmission over the communication network 1919 via the antenna 1918.

The DSP 1920 not only processes communication signals, but also provides for receiver and transmitter control. For example, the gains applied to communication signals in the receiver 1912 and transmitter 1914 may be adaptively controlled through automatic gain control algorithms implemented in the DSP 1920.

The device 24 preferably includes a microprocessor 1938 which controls the overall operation of the device. Communication functions, including at least data and voice communications, are performed through the communication subsystem 1911. The microprocessor 1938 also interacts with further device subsystems such as the display 1922, flash memory 1924, random access memory (RAM) 1926, auxiliary input/output (I/O) subsystems 1928, serial port 1930, keyboard 1932, speaker 1934, microphone 1936, a short-range communications subsystem 1940 and any other device subsystems generally designated as 1942.

Some of the subsystems shown in FIG. 21 perform communication-related functions, whereas other subsystems may provide "resident" or on-device functions. Notably, some subsystems, such as keyboard 1932 and display 1922 for example, may be used for both communication-related functions, such as entering a text message for transmission over a communication network, and device-resident functions such as a calculator or task list.

Operating system software used by the microprocessor 1938 is preferably stored in a persistent store such as flash memory 1924, which may instead be a read only memory (ROM) or similar storage element (not shown). Those skilled in the art will appreciate that the operating system, specific device applications, or parts thereof, may be temporarily loaded into a volatile store such as RAM 1926. It is contemplated that received communication signals may also be stored to RAM 1926.

The microprocessor 1938, in addition to its operating system functions, preferably enables execution of software applications on the device. A predetermined set of applications which control basic device operations, including at least data and voice communication applications for example, will normally be installed on the device 24 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the device 24 through the network 1919, an auxiliary I/O subsystem 1928, serial port 1930, short-range communications subsystem 1940 or any other suitable subsystem 1942, and installed by a user in the RAM 1926 or preferably a non-volatile store (not shown) for execution by the microprocessor 1938. Such flexibility in application installation increases the functionality of the device and may provide enhanced on-device functions, communication-related functions, or both. For example, secure communication applications may enable electronic commerce functions and other such financial transactions to be performed using the device 24.

In a data communication mode, a received signal such as a text message or web page download will be processed by the communication subsystem 1911 and input to the microprocessor 1938, which will preferably further process the received signal for output to the display 1922, or alternatively to an auxiliary I/O device 1928. A user of device 24 may also compose data items such as email messages for example, using the keyboard 1932, which is preferably a complete alphanumeric keyboard or telephone-type keypad, in conjunction with the display 1922 and possibly an auxiliary I/O device 1928. Such composed items may then be transmitted over a communication network through the communication subsystem 1911.

For voice communications, overall operation of the device 24 is substantially similar, except that received signals would preferably be output to a speaker 1934 and signals for transmission would be generated by a microphone 1936. Alternative voice or audio I/O subsystems such as a voice message recording subsystem may also be implemented on the device 24. Although voice or audio signal output is preferably accomplished primarily through the speaker 1934, the display 1922 may also be used to provide an indication of the identity of a calling party, the duration of a voice call, or other voice call related information for example.

The serial port 1930 in FIG. 21 would normally be implemented in a personal digital assistant (PDA)-type communication device for which synchronization with a user's desktop computer (not shown) may be desirable, but is an optional device component. Such a port 1930 would enable a user to set preferences through an external device or software application and would extend the capabilities of the device by providing for information or software downloads to the device 24 other than through a wireless communication network. The alternate download path may for example be used to load an encryption key onto the device through a direct and thus reliable and trusted connection to thereby enable secure device communication.

A short-range communications subsystem 1940 is a further optional component which may provide for communication between the device 1924 and different systems or devices, which need not necessarily be similar devices. For example, the subsystem 1940 may include an infrared device and associated circuits and components or a Bluetooth™ communication module to provide for communication with similarly-enabled systems and devices.

Figure 22:
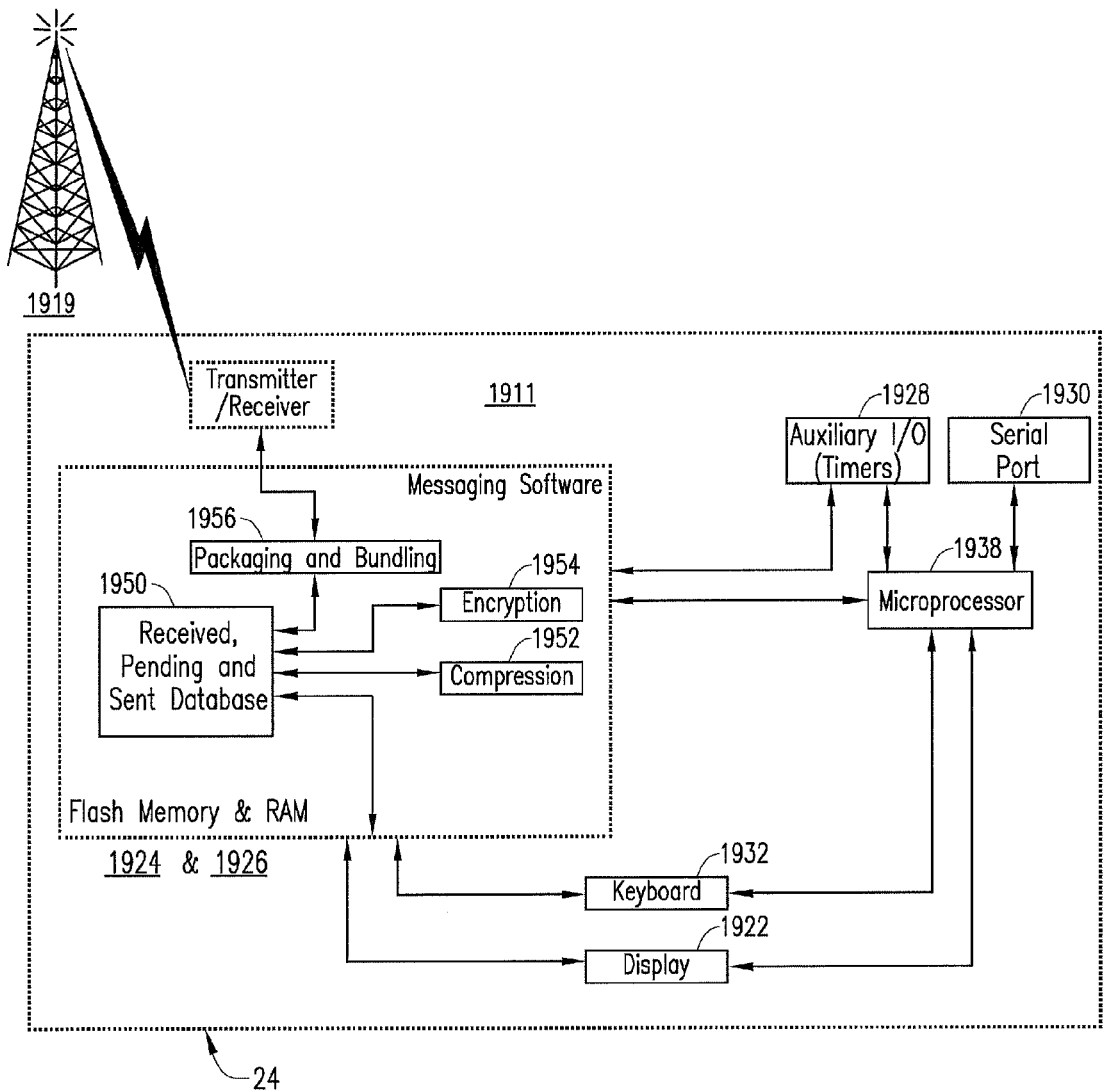
FIG. 22 illustrates the mobile device modules involved with bundling multiple commands and data items together for transmission to the message server.
Figure 23:
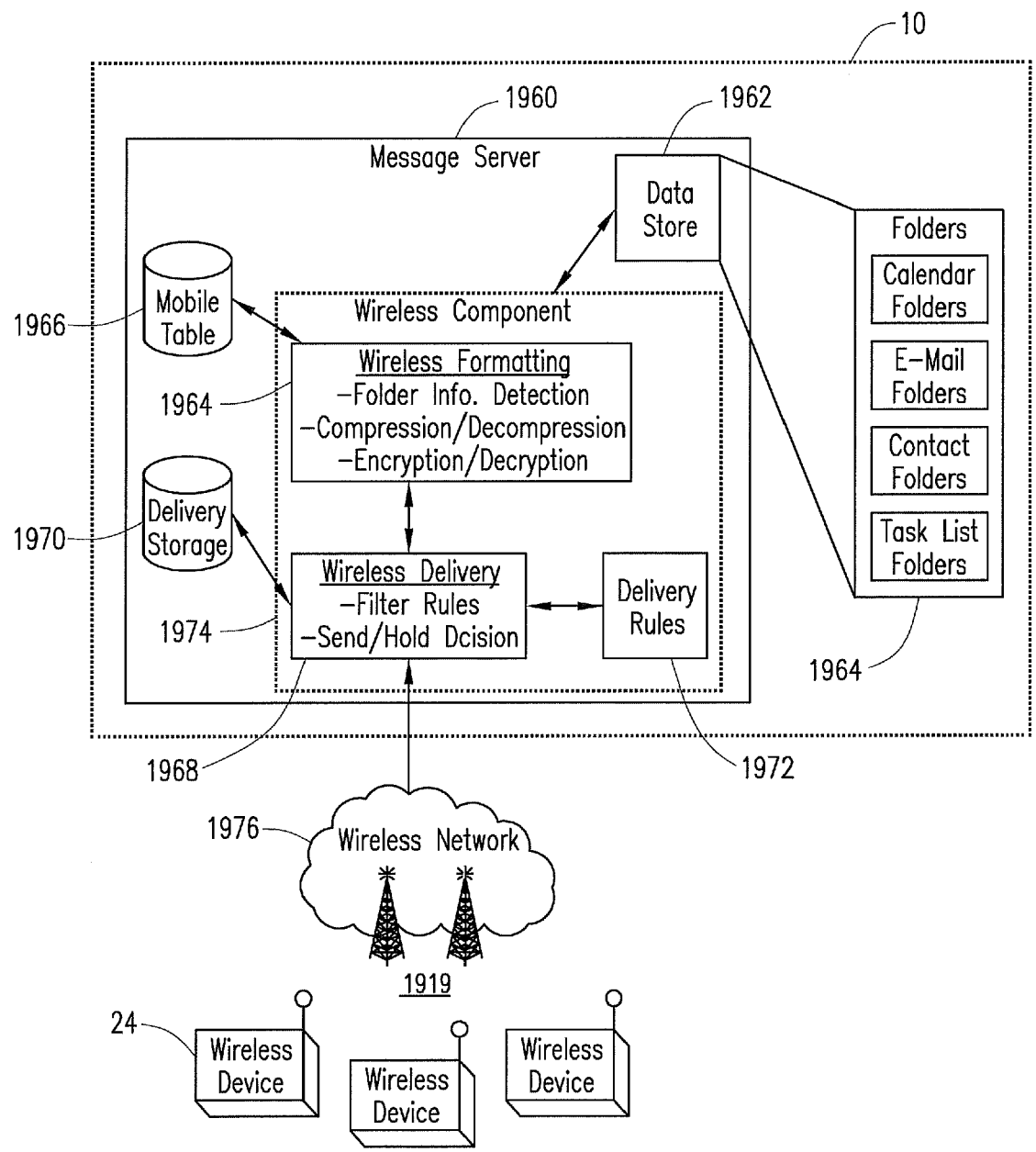
FIG. 23 illustrates the message server components involved with bundling multiple commands and data items together for transmission to the mobile device.
Figure 24:
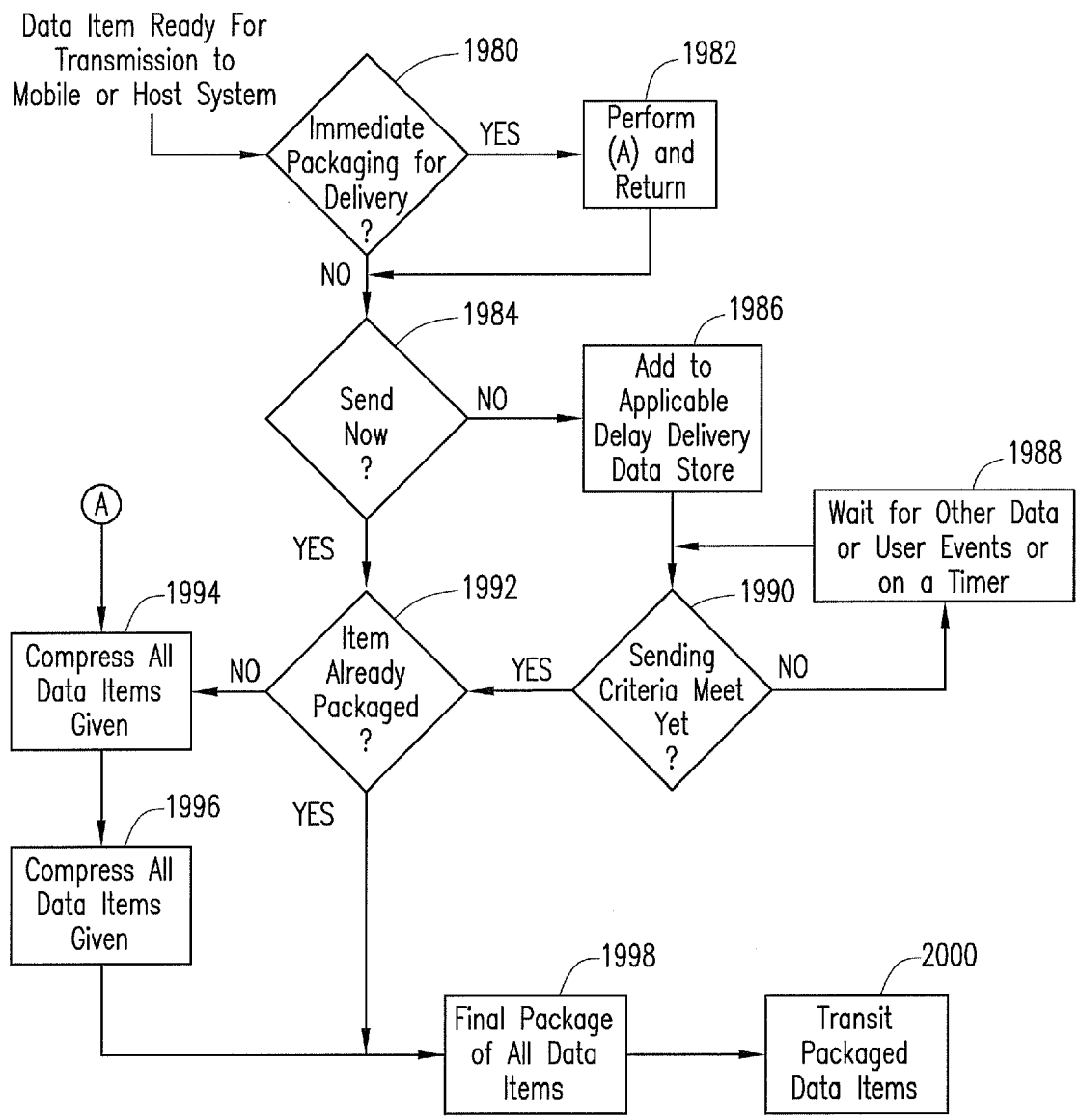
FIG. 24 is a data flow diagram of the steps used to collect a series of data items for sending to either the message server or the mobile device.

Turning now to FIGS. 22 through 24 there is a detailed description and presentation for an advanced method for dealing with the extra traffic generated from supportly automatic over-the-air synchronization of data items and folder moves. Even though the method of automatic over-the-air-synchronization presented in different parts of this description is preferable, it does have some drawbacks. Specifically these drawbacks occur when a mobile device can potentially transmit frequently many data and command packets over the wireless network. Further drawbacks include (1) low bandwidth on the particular wireless network that the mobile device works with is not very robust to handle an overwhelming amount of data transfers, (2) higher costs for the service provider, user or both are generally associated with such frequent data exchanges, (3) very high network cost and power source drain on the mobile device for sending small amounts of data and (4) heavier power usage on the mobile device's power source may prematurely drain the power resources of the mobile device. Therefore, it may be desirable to (1) switch the over-the-air-synchronization feature off and to leave synchronization of information organization until device-host synchronization through a wired interface cradle when the mobile device is synchronized via a serial connection to the host system/computer, or (2) leave the option to the user to switch on the feature for a period of time until switched off by the user or after the expiration of predetermined period of time. In another embodiment of the present invention, the mobile device 24 bundles together and preferably compresses the various synchronizations, move commands (or other operations) created during the day and transmits the bundled information as one or more data packet transmissions during non-peak network usage or transmission times, as illustrated in FIGS. 22 through 24. Preferably, the bundling and the optional compression step reduce the number and size of data packets to be sent over the wireless network. At the host system, the redirector component receives, unbundles and appropriately acts on the information. Naturally, the reverse is also within the scope of the invention, namely the redirector bundles together and preferably compresses the various synchronizations, move commands (or other operations) created during the day and transmits the bundled information as one or more data packet transmissions during non-peak network usage or transmission times. Preferably, the bundling and the optional compression step reduce the number and size of data packets to be sent over the wireless network. At the mobile device, the device receives, unbundles and appropriately acts on the information.

Turning now to FIG. 22 there is an illustration of the key components within the mobile device 24 that are involved with supporting bundling of multiple data items for transmit. On the mobile device 24 are many hardware components all working together to perform real-time messaging on behalf of the user. Underlying all these components is a Central Processing Unit (CPU) that is permitting the execution of software. At the heart of the mobile device in question is messaging software running within the RAM and/or flash memory 1924 and 1926 of the mobile device 24. The messaging software is primarily handling user actions and incoming events from the transmitter receiver 1911. User actions are input from the keyboard 1932 and are presented to the user via the display 1922. Although it is common to accept keyed in messages and commands from the user and immediately sending them to the host, this system implements a database 1950 on the mobile to buffer these events. Within the database 1950 there is stored incoming received messages, messages that are pending and messages that have been sent. Pending messages could use a wide range of criteria to decide whether they can be sent. These criteria include but is not limited to: maximum message size, maximum time reached, the specific type of message, the destination address, a content identifier in the subject or body or a set of configuration parameter within the device. Configuration parameters could further include: the time of the day, the day of the week, the delay that has occurred on previous transmits, the current battery level, the current signal strength of the base station, the number of messages transmitted in the past 'N' minutes or hours and received network parameters set by the network operator. These network parameters received from the base station could include a duty cycle based on activity level, the number of other mobiles currently using the same base station, and the purchased support level of network airtime, i.e. gold, silver or bronze level support. Many of these same criteria are similar to the message server 1960 as introduced in FIG. 23. One skilled in the art could probably add their own criteria to extend this list even further.

When the first data or command event reaches the database a timer 1928 is run to ensure that data times are transmitted with some frequency. Although it is possible for data items to be suspected a very long time, i.e. to off-peak hours in the day midnight until 6 am for example, a timer is always needed to kick off the transmit if the user is not performing additional activities. Where possible different events, including both data events and command events, can be concatenated together in a single transmit off the device. This technique is often called piggy-packing and in communication systems is common when data and commands are exchanged between common systems. In the context of this patent the term command is meant to refer to data items not directly input by the user. These could include folder move operations, message read indications and message delete indications. These commands are side effects from an action the user has performed where they may, or may not, have known that a transmit would be caused from their action. Some time before the transmission the information is compressed 1952, encrypted 1954 and prepared for transmission across the wireless network. The step of compressing and encrypting can take place either before or after the message is stored in the pending database 1950.

One of the final stages before transmitting is the packaging and bundling stage 1956. This stage is important as it allows the receiver to unbundled multiple data items, or data items and command items that are piggy-backed together. It is likely on the receiving side that different components process data items and command items.

Turning now to FIG. 23 there is an overview of the host system 10 components used to send and receive bundled messages that are exchanged with mobile devices. Within the host system 10 is a message server 1960. The message server could be a traditional Microsoft™ Exchange Server or a Lotus™ Notes Server or some other database server from Oracle™ or Sybase™. The message server 1960 is generally the heart of all information exchanged and is the main interface into the data store 1962. The data store 1962 is where the information of the entire company is kept and is organized into folder hierarchies 1964 that divide the information for each user and the type of information being saved. Although there could be several message servers each taking responsibility for different data classifications, the idea of folders and hierarchies 1964 still applies. Working with the data storage component, within the message server 1960 is a wireless component 1974. The messaging component 1974 acts as the liaison between the message server 1960 and the wireless device 24. The wireless component 1960 also has been presented as the redirector software 12 within this patent. The wireless component 1974 uses the mobile table 1966 to indicate which users have mobile devices 24. Each user with a mobile device will get their information pushed to their mobile device 24 as the data and commands become available. Based on certain criteria the host will select its moments to redirect data and commands to the mobile device 24, these rules and send/hold decision are made in a subcomponent known as the wireless delivery component 1968.

Going through the steps in greater detail first we have an event take place within the message server 1960. The event could be a new data item arriving to the data store 1962, or a data item has been modified, i.e. moved between folders within the data store 1962. The change within the data store 1962 is first detected by the wireless formatting component 1964 within the wireless component 1974. The message is normally compressed, encrypted and given to the wireless delivery component 1968. This component checks the filter rules and the send/receive state and the delivery rules 1972 to determine when to send data to the mobile device 24. If there are already messages pending for the mobile device then the message may be placed into the storage area 1970 and a timer is run to wake-up and send the data. The sending schemes on the host system 10 can be as rich as the ones on the mobile device 24. Some of the criteria that can be used can include but is not limited to: maximum message size, maximum time reached for data being sent to mobile, the specific type of message calendar message are highest priority as they are time sensitive, the destination mobile address, i.e. the president's information is never delayed, a content identifier in the subject or body or a set of configuration parameter within the delivery rules 1972. Delivery rules could further include: the time of the day, the day of the week, the delay that has occurred on previous transmit before a confirmation was received, the number of messages transmitted in the past 'N' minutes or hours and whether the user is a gold, silver or bronze level user. Configuring a user as a gold user will cost more with the network operator but will mean that messages don't have to be delayed going to this user. Another way to view this delivery level is to use a pricing structure that is similar to cell phone models today. A user of a cell phone can pay several pricing models based on their usage per month. Similar a data centric user might pay different levels based on how much data is transmitted and when it is transmitted. Another preferred embodiment would be to handle the case where certain e-mail addresses are held up until low peak hours. Specifically mail sent to ALL EMPLOYEES group e-mail address would be good candidates for being delayed.

Turning now to FIG. 24, there is provided a method to limit the use of network airtime and mobile transmitters by either the host system 10 or the mobile device 24. At step 1980, a data item is received by a wireless transport component and may be packaged immediately in preparation for transmission 1980. This transport component could be messaging software running in RAM on the mobile device, or the wireless component 1974 running in the messaging server 1960. This data item could be either a data message or a command message being exchanged between the host system 10 and the mobile device 24. If the data is to be packaged 1982 the compression 1994 and encryption 1996 libraries are called to perform their transformations. This would probably be a user decision because the step of pre-compressing and pre-encrypting each data item individually will save time later, but will take extra physical overhead as head item will require a larger message header. Once this is complete, or if there was no immediate packaging of the information a further test is performed to see if the data item can be transmitted immediately 1984. The sending logic of the software will have certain criteria used to decide whether to send immediately, for example it could be off-peak hours and everything is sent immediately. If this item is to be sent immediately a further check is made to see if the item was already compressed and encrypted 1992. If the item is not ready for shipment then the compression 1994 and encryption 1996 libraries are called. If yes, then the item is provided for final packaging 1998 and transmission 2000 to the host or mobile system.

If the host system 10 or mobile device 24 is using a bundling technique then the test of 1984 would be not to send immediately. The data would therefore be added to the applicable delay delivery data store 1986 and a test is performed to see if the addition of this new item has generated any new sending criteria 1990. This new item might have reach a total number of character threshold, or it might have provided a piggy-backing possibility for the device or host. If there is no sending criteria met a timer is started and the software goes into a wait cycle 1988 in preparation for another data event or for the timer to expire. After a period of time has lapsed (step 1988), another check is performed to determine whether it is now appropriate to transmit the data item(s). If so, then a test is performed to see if the data items were already compressed and encrypted and if they have not been prepared all the data items are collected and provided to the compression 1994 and encryption 1996 libraries. Once complete the data item is provided for final packaging 1998 and transmission 2000. When possible, performing a bulk compression and encryption is the most efficient and is the preferred embodiment for the system. If the information is already compressed and encrypted the information it is provided for final packaging 1998 and transmission 2000. Advantageously, this store, delay and transmit method reduces network bandwidth demand for the host system 10 and the mobile device 24, and has the added benefit of reducing the power requirements for the mobile device. By conserving the power store of the mobile device the user will benefit from longer usage and reduced cost. The determination of whether to transmit or bundle can be handled very dynamically to provide the user with maximum benefit. For example, the device may do the automatic over-the-network automatic transmission of emails and calendar events from the device, but delay the transmission of folder moves until non-peak times or alternatively, delay communication of such changes until a physical synchronization occurs.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A method of redirecting data items to a user of a mobile data communication device that is associated with a host system and communicates therewith via a wireless network, the method comprising:
   detecting arrival of data items for a user at the host system from one or more senders, the data items being directed to an address associated with the user at the host system;
   determining a delivery level provisioned for the user at the host system; and
   responsive to the delivery level, applying a delivery rule with respect to the data items received for the user to bundle at least a portion of the data items for transport in a single transmission to the user via the wireless network.

2. A system for redirecting data items to a user of a mobile data communication device that is associated with a host system and communicates therewith via a wireless network, the method comprising:
   means for detecting arrival of data items for a user at the host system from one or more senders, the data items being directed to an address associated with the user at the host system;
   means for determining a delivery level provisioned for the user at the host system; and
   means, responsive to determining the delivery level, for applying a delivery rule with respect to the data items received for the user to bundle at least a portion of the data items for transport in a single transmission to the user via the wireless network.

3. The system according to claim 2, wherein the means for applying the delivery rule comprises means for placing at least one of the data items in a storage area until a condition of the delivery rule is met.

4. The system according to claim 3, wherein the means for applying the delivery rule comprises means for retrieving the at least one of the data items when the condition is met and transmitting the at least one of the data items to the mobile communication device.

5. The system according to claim 3, further comprising means for performing at least one of encryption and compression on each of the at least one data item when each data item is placed in the storage area.

6. The system according to claim 4, wherein at least one of encryption and compression are applied to the at least one data item when the at least one data item is retrieved from the storage area for transmission.

7. The system according to claim 2, wherein the means for applying the delivery rule stores the at least one data item for delivery at a specified off-peak time.

8. The system according to claim 2, wherein the means for applying the delivery rule stores the at least one data item until a maximum time limit is reached.

9. The system according to claim 2, wherein the means for applying the delivery rule stores a data item for bundling when the data item originates from a specified email address.

10. The method according to claim 1, wherein applying the delivery rule comprises placing at least one of the data items in a storage area until a condition of the delivery rule is met.

11. The method according to claim 10, wherein applying the delivery rule comprises retrieving the at least one of the data items when the condition is met and transmitting the at least one of the data items to the mobile communication device.

12. The method according to claim 10, wherein at least one of encryption and compression are applied to the at least one data item when the item is placed in the storage area.

13. The method according to claim 11, wherein at least one of encryption and compression are applied to the at least one data item when the at least one data item is retrieved from the storage area for transmission.

14. The method according to claim 1, wherein applying the delivery rule comprises holding the at least one data item for delivery at a specified off-peak time.

15. The method according to claim 1, wherein applying the delivery rule comprises holding the at least one data item until a maximum message size is reached.

16. The method according to claim 1, wherein applying the delivery rule comprises holding the at least one data item until a maximum time limit is reached.

17. The method according to claim 1, wherein applying the delivery rule comprises holding a data item for bundling when the data item originates from a specified email address.

* * * * *

UNITED STATES PATENT AND TRADEMARK OFFICE
CERTIFICATE OF CORRECTION

PATENT NO. : 7,734,281 B2
APPLICATION NO. : 11/925803
DATED : June 8, 2010
INVENTOR(S) : Tabitha Ferguson et al.

Page 1 of 1

It is certified that error appears in the above-identified patent and that said Letters Patent is hereby corrected as shown below:

Column 27, line 51, "supportly" should be changed to --supporting--.

Column 29, line 4, "suspected" should be changed to --suspended--; and
line 10, "piggy-packing" should be changed to --piggy-backing--.

Column 31, line 53 claim 2, "method" should be changed to --system--.

Signed and Sealed this
Thirtieth Day of August, 2011

David J. Kappos
*Director of the United States Patent and Trademark Office*